United States Patent
Kozlenko et al.

(10) Patent No.: US 12,479,608 B2
(45) Date of Patent: Nov. 25, 2025

(54) ATTACHMENT INTERFACE AND ATTACHMENTS FOR AN UNMANNED AERIAL VEHICLE

(71) Applicant: Skydio, Inc., San Mateo, CA (US)

(72) Inventors: Yevgeniy Kozlenko, Mountain View, CA (US); Vivian Zhou, San Mateo, CA (US); Adam Nathan Lebovitz, San Mateo, CA (US); Jack Zi Qi Ye, Cupertino, CA (US); Joseph Anthony Enke, San Carlos, CA (US); Enyu Luo, Redwood City, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 18/409,633

(22) Filed: Jan. 10, 2024

(65) Prior Publication Data
US 2024/0228071 A1 Jul. 11, 2024

Related U.S. Application Data

(60) Provisional application No. 63/479,258, filed on Jan. 10, 2023.

(51) Int. Cl.
*B64U 20/40* (2023.01)
*B64U 10/14* (2023.01)
*B64U 20/80* (2023.01)

(52) U.S. Cl.
CPC ............. *B64U 20/40* (2023.01); *B64U 10/14* (2023.01); *B64U 20/80* (2023.01)

(58) Field of Classification Search
CPC ........ B64U 20/40; B64U 10/14; B64U 20/80; B64U 2201/104; B64U 2201/20
See application file for complete search history.

(56) References Cited

U.S. PATENT DOCUMENTS

| | | | |
|---|---|---|---|
| 8,268,668 B1 * | 9/2012 | Pham | H01L 23/573 438/106 |
| 9,580,173 B1 * | 2/2017 | Burgess | G05D 1/102 |
| 10,099,784 B1 * | 10/2018 | Nilson | B64U 20/60 |
| 10,435,143 B1 * | 10/2019 | O'Brien | B64U 20/80 |
| 10,717,524 B1 * | 7/2020 | Boyes | G06Q 10/083 |
| 11,636,447 B1 * | 4/2023 | Mishra | G07C 5/006 705/305 |
| 11,858,655 B2 * | 1/2024 | Dondoneau | H04N 23/90 |
| 11,983,020 B2 * | 5/2024 | Watts | G06F 3/0482 |
| 11,987,401 B2 * | 5/2024 | Prsa | H04B 7/18506 |
| 12,071,240 B2 * | 8/2024 | Agostino | B64D 37/005 |
| 2012/0325077 A1 * | 12/2012 | Davis | F41C 27/00 248/65 |

(Continued)

OTHER PUBLICATIONS

International Search Report and Written Opinion, mailed on Jun. 19, 2024 in corresponding PCT Application No. PCT/US2024/011101.

*Primary Examiner* — Medhat Badawi
(74) *Attorney, Agent, or Firm* — Young Basile Hanlon & MacFarlane, P.C.

(57) ABSTRACT

An unmanned aerial vehicle system that includes an unmanned aerial vehicle and an attachment. The unmanned aerial vehicle includes an attachment interface located on a side of the unmanned aerial vehicle. The attachment is configured to removably couple to the attachment interface such that the attachment is positioned adjacent to the side of the unmanned aerial vehicle.

20 Claims, 16 Drawing Sheets

(56) References Cited

U.S. PATENT DOCUMENTS

| | | | |
|---|---|---|---|
| 2013/0287577 A1* | 10/2013 | Lin | B64U 30/291 |
| | | | 416/210 R |
| 2016/0137306 A1* | 5/2016 | Ji | B64U 50/19 |
| | | | 244/54 |
| 2016/0229536 A1* | 8/2016 | Aull | B64D 13/00 |
| 2016/0332747 A1* | 11/2016 | Bradlow | H04R 1/08 |
| 2017/0015418 A1* | 1/2017 | Matus | B64U 50/19 |
| 2017/0134699 A1* | 5/2017 | Kim | H04N 7/183 |
| 2017/0163896 A1* | 6/2017 | Kang | G03B 15/006 |
| 2017/0217599 A1* | 8/2017 | Peng | H02K 9/06 |
| 2018/0002015 A1* | 1/2018 | McCullough | B64D 1/08 |
| 2018/0072415 A1* | 3/2018 | Cantrell | B64D 1/10 |
| 2018/0227469 A1* | 8/2018 | Osanai | H04N 23/55 |
| 2018/0244365 A1* | 8/2018 | Fisher | B64U 10/14 |
| 2018/0319490 A1* | 11/2018 | Baek | B64C 11/02 |
| 2019/0100313 A1* | 4/2019 | Campbell | B64U 10/14 |
| 2019/0161190 A1* | 5/2019 | Gil | E05F 15/77 |
| 2019/0215457 A1* | 7/2019 | Enke | G03B 15/006 |
| 2019/0321971 A1* | 10/2019 | Bosworth | B25J 15/0028 |
| 2019/0373173 A1* | 12/2019 | Wang | G03B 15/006 |
| 2020/0317324 A1* | 10/2020 | Youmans | B64C 27/20 |
| 2020/0354084 A1* | 11/2020 | Priest | B64U 10/14 |
| 2021/0053679 A1* | 2/2021 | Johannesson | B64U 20/80 |
| 2021/0171198 A1* | 6/2021 | Prsa | B64U 10/14 |
| 2021/0240185 A1* | 8/2021 | Yang | B64U 50/19 |
| 2021/0245860 A1* | 8/2021 | Bry | B64U 60/50 |
| 2022/0012046 A1 | 1/2022 | Lee et al. | |
| 2023/0002046 A1* | 1/2023 | Pegg | B64U 10/14 |
| 2024/0228071 A1* | 7/2024 | Kozlenko | B64U 10/14 |
| 2024/0228074 A1* | 7/2024 | Kozlenko | B64U 10/14 |
| 2024/0228076 A1* | 7/2024 | Kozlenko | B64U 20/40 |
| 2025/0026505 A1* | 1/2025 | Robbins-Rothman | |
| | | | B64U 20/70 |
| 2025/0026506 A1* | 1/2025 | Robbins-Rothman | |
| | | | B64U 10/14 |

\* cited by examiner

ATTACHMENT INTERFACE AND ATTACHMENTS FOR AN UNMANNED AERIAL VEHICLE

CROSS-REFERENCE TO RELATED APPLICATION(S)

This application claims the benefit of U.S. Provisional Patent Application No. 63/479,258, filed Jan. 10, 2023, the entire disclosure of which is hereby incorporated by reference.

TECHNICAL FIELD

This disclosure relates to unmanned aerial vehicles (UAVs), and more specifically, to an attachment interface and attachments for a UAV.

BACKGROUND

Conventional UAVs may often be intended for a specific function or purpose, such as photography and/or image mapping. Due to such intended purposes, UAVs may often be equipped with built-in equipment, such as one or more cameras and/or one or more sensors. The built-in equipment of the UAV may therefore be difficult to remove and/or replace. Additionally, such conventional UAVs may be limited to their intended purposes due to the built-in equipment, thereby preventing customization and/or interchangeability of various equipment for the UAV.

SUMMARY

In one aspect of the present disclosure, an unmanned aerial vehicle system is disclosed. The unmanned aerial vehicle system includes an unmanned aerial vehicle and an attachment. The unmanned aerial vehicle includes an attachment interface located on a side of the unmanned aerial vehicle. The attachment is configured to removably couple to the attachment interface such that the attachment is positioned adjacent to the side of the unmanned aerial vehicle.

In certain configurations, the attachment interface may include an attachment surface, whereby at least a portion of the attachment may be configured to directly or indirectly abut the attachment surface. The attachment interface may also include a connector port configured to receive a connector of the attachment to electrically couple the attachment to the unmanned aerial vehicle. The attachment may be configured to directly abut the attachment surface when the attachment is removably coupled to the unmanned aerial vehicle.

In certain configurations, an attachment bracket may be coupled to the attachment and configured to removably couple the attachment to the attachment surface. The attachment interface may include one or more mounting holes located on the attachment surface. The one or more mounting holes of the attachment surface may be configured to align with one or more mounting holes of the attachment bracket such that one or more fasteners may extend through the one or more mounting holes of the attachment bracket and the one or more mounting holes of the attachment interface.

In certain configurations, the attachment may be configured to mechanically and electrically couple to the unmanned aerial vehicle. The attachment may be powered by a power source of the unmanned aerial vehicle.

In certain configurations, the unmanned aerial vehicle may include a first attachment interface located on a first side of the unmanned aerial vehicle and a second attachment interface located on a second side of the unmanned aerial vehicle. The attachment may be configured to removably couple to the first attachment interface or the second attachment interface.

In another aspect of the present disclosure, an unmanned aerial vehicle system is disclosed. The aerial vehicle system includes an unmanned aerial vehicle and one or more attachments. The aerial vehicle system includes attachment interfaces, whereby the attachment interfaces include a top attachment interface located on a top surface of the unmanned aerial vehicle, a first side attachment interface located on a first side surface of the unmanned aerial vehicle, a second side attachment interface located on a second side surface of the unmanned aerial vehicle that opposes the first side surface, and a bottom attachment interface located on a bottom surface of the unmanned aerial vehicle. The one or more attachments are configured to removably couple to at least one of the top attachment interface, the first side attachment interface, the second side attachment interface, or the bottom attachment interface.

In certain configurations, each of the attachment interfaces may include an attachment surface and one or more mounting holes disposed on the attachment surface. The one or more attachments may be configured for positioning that is adjacent to the attachment surface when the one or more attachments are removably coupled to the unmanned aerial vehicle. The top attachment interface and the bottom attachment interface may each include projections that extend from the attachment surface that are configured to align the attachment with the attachment surface such that one or more fasteners extend through the attachment and into the one or more mounting holes. The projections may define a perimeter located on the attachment surface that encompasses the one or more mounting holes. The perimeter may encompass a connector port.

In certain configurations, each of the attachment interfaces may further include a connector port that is configured to electrically couple to a connector of the one or more attachments such that the one or more attachments are powered by a power source of the unmanned aerial vehicle. The connector may include a male keying portion that is configured to insert into a female keying portion of the connector port.

In another aspect of the present disclosure, an unmanned aerial vehicle system is disclosed. The unmanned aerial vehicle system includes an unmanned aerial vehicle and an attachment. The unmanned aerial vehicle includes an attachment interface located on a top side or a bottom side of the unmanned aerial vehicle with respect to an elevational direction of movement of the unmanned aerial vehicle. The attachment interface includes an attachment surface, mounting holes located on the attachment surface, and a connector port. The attachment is configured to removably couple to the attachment surface via fasteners that extend through the attachment and into respective ones of the mounting holes. The attachment is further configured to electrically couple to the connector port via a connector that is inserted into the connector port.

In certain configurations, the attachment interface may further include projections that extend from the attachment surface and define a perimeter. The attachment may be configured for positioning within the perimeter when the attachment is removably coupled to the attachment surface.

The connector port may be located within a recess defined by the attachment surface and the perimeter may encompass the connector port.

In certain configurations, the attachment interface may further include a cover disposed over the connector port that is configured to protect the connector port when the attachment is not removably coupled to the attachment surface.

In certain configurations, the connector port may be configured to receive a universal bus connector of the attachment.

In another aspect of the present disclosure, an unmanned aerial vehicle system is disclosed. The unmanned aerial vehicle system includes an unmanned aerial vehicle and one or more attachments. The unmanned aerial vehicle includes an attachment interface and the one or more attachments are configured to removably couple to the attachment interface and electrically connect to the unmanned aerial vehicle to power the one or more attachments via a power source of the unmanned aerial vehicle.

In certain configurations, the one or more attachments may include a speaker and microphone attachment. The attachment interface may be located on a side surface of a housing of the unmanned aerial vehicle. The attachment interface may include an attachment surface that is located on, or integrally formed with, the side surface of the housing, wherein the speaker and microphone attachment is configured to mount to the attachment surface.

In certain configurations, the one or more attachments may include a global positioning system attachment. The attachment interface may be located on a top surface or a bottom surface of a housing of the unmanned aerial vehicle. The attachment interface may include an attachment surface that is located on, or integrally formed with, the top surface or the bottom surface of the housing. The global positioning system attachment may be configured to removably couple to the attachment surface by one or more fasteners.

In certain configurations, the one or more attachments may include a spotlight attachment that is configured to project from a side of unmanned aerial vehicle. The spotlight attachment may include an attachment bracket that is configured to mount to an attachment surface of the attachment interface. The attachment surface may be located on the side of the unmanned aerial vehicle and disposed on, or integrally formed with, a housing of the unmanned aerial vehicle. The attachment bracket may be coupled to the attachment surface via one or more fasteners that extend through the attachment bracket and into the housing.

In certain configurations, the one or more attachments may include an infrared light attachment.

In another aspect of the present disclosure, an unmanned aerial vehicle system is disclosed. The unmanned aerial vehicle system includes an unmanned aerial vehicle and attachments. The unmanned aerial vehicle system includes attachment interfaces located on the unmanned aerial vehicle. The attachments are configured to removably couple to the attachment interfaces. The attachments are interchangeable and include a global positioning system attachment, a speaker and microphone attachment, a spotlight attachment, and an infrared light attachment.

In certain configurations, the attachment interfaces may include a top attachment interface located on a top surface of the unmanned aerial vehicle, a first side attachment interface located on a first side surface of the unmanned aerial vehicle, a second side attachment interface located on a second side surface of the unmanned aerial vehicle that opposes the first side surface, and a bottom attachment interface located on a bottom surface of the unmanned aerial vehicle. The global positioning system attachment and the infrared light attachment may be configured to removably couple to at least one of the top attachment interface or the bottom attachment interface. The speaker and microphone attachment and the spotlight attachment may be configured to removably couple to at least one of the first side attachment interface or the second side attachment interface.

In certain configurations, the attachments may be configured to mechanically and electrically couple to the unmanned aerial vehicle system.

In another aspect of the present disclosure, an unmanned aerial vehicle system is disclosed. The unmanned aerial vehicle system may include an unmanned aerial vehicle and a speaker and microphone attachment. The unmanned aerial vehicle includes an attachment interface located on a side surface of the unmanned aerial vehicle. The speaker and microphone attachment is configured to removably couple to the attachment interface and electrically connect to the unmanned aerial vehicle to power the speaker and microphone attachment via a power source of the unmanned aerial vehicle.

The speaker and microphone may include an attachment bracket that is configured to mount to an attachment surface of the attachment interface to removably couple the speaker and microphone attachment to the unmanned aerial vehicle. The attachment surface may be located on, or integrally formed with, the side surface of the unmanned aerial vehicle.

In another aspect of the present disclosure, an unmanned aerial vehicle system is disclosed. The unmanned aerial vehicle system includes an unmanned aerial vehicle and an attachment. The unmanned aerial vehicle includes an attachment interface. One or more characteristics of the unmanned aerial vehicle are modified in response to the attachment being removably coupled to the attachment interface.

In certain configurations, the one or more characteristics may include one or more of flight characteristics, power consumption characteristics, and user interface characteristics. The attachment may be configured to transmit intrinsic characteristics associated with the attachment to the unmanned aerial vehicle and the unmanned aerial vehicle is configured to modify the one or more characteristics of the unmanned aerial vehicle based on the intrinsic characteristics.

In certain configurations, the attachment may be configured to mechanically and electrically couple to the unmanned aerial vehicle. The attachment may be powered by a power source of the unmanned aerial vehicle. The attachment may be configured to electrically couple to the unmanned aerial vehicle via a universal serial bus connector.

In certain configurations, a unmanned aerial vehicle system may further comprise a user device in communication with the unmanned aerial vehicle that outputs a graphical user interface. The unmanned aerial vehicle may be configured to modify the graphical user interface in response to the attachment being removably coupled to the attachment interface.

In another aspect of the present disclosure, a method is disclosed. The method includes determining that an attachment is mounted to an attachment surface of an unmanned aerial vehicle, determining that the attachment is electrically coupled to the unmanned aerial vehicle via a connector of the attachment being inserted into a connector port of the unmanned aerial vehicle, and responsive to determining that the attachment is electrically coupled to the unmanned aerial vehicle, modifying one or more characteristics of the unmanned aerial vehicle.

In certain configurations, the one or more characteristics of the unmanned aerial vehicle may include flight characteristics, power consumption characteristics, or both. Responsive to determining that the attachment is electrically coupled to the unmanned aerial vehicle, the method may further include providing intrinsic characteristics associated with the attachment to the unmanned aerial vehicle. Modifying the one or more characteristics of the unmanned aerial vehicle may be based upon the intrinsic characteristics.

In certain configurations, responsive to determining that the attachment is electrically coupled to the unmanned aerial vehicle, the method may further include modifying a user interface of the unmanned aerial vehicle. A user device in communication with the unmanned aerial vehicle graphically may output the user interface. Modifying the user interface may include adjusting the user interface such that the user interface is operable to control operation of the attachment.

In certain configurations, the connector may be a universal serial bus connector. The attachment may be powered by a power source of the unmanned aerial vehicle via the universal serial bus connector.

In another aspect of the present disclosure, an unmanned aerial vehicle system is disclosed. The unmanned aerial vehicle system includes an unmanned aerial vehicle, an attachment mechanically and electrically coupled to the unmanned aerial vehicle, and a user interface operable to control the unmanned aerial vehicle and the attachment. At least one of flight characteristics of the unmanned aerial vehicle or user interface characteristics of the user interface are modified in response to electrically coupling the attachment to the unmanned aerial vehicle.

In certain configurations, both the flight characteristics of the unmanned aerial vehicle and the user interface characteristics of the user interface may be modified in response to electrically coupling the attachment to the unmanned aerial vehicle.

In certain configurations, the attachment may include a connector fixedly coupled to the attachment and configured for at least partial insertion into a connector port of the unmanned aerial vehicle.

In certain configurations, the attachment may include a connector coupled to the attachment via wiring and configured for at least partial insertion into a connector port of the unmanned aerial vehicle.

In certain configurations, the attachment may be powered by a battery that powers the unmanned aerial vehicle.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present disclosure relates to a UAV. The UAV may be configured to secure one or more attachments to the UAV such that the one or more attachments may be operable during operation (e.g., flight) of the UAV. By way of example, the one or more attachments may be coupled to the UAV and in communication with the UAV such that, during flight of the UAV, the one or more attachments may be controlled by a user via a user interface. While examples of attachments are described herein, it is envisioned that any type of attachment may be compatible with the UAV as described herein.

Conventional UAVs may often include a system that includes one or more components. The components may be fixedly secured to the UAV or integrally connected to the UAV. Such components may often be secured to the UAV in a manner that hinders removal and/or replacement. By way of example, the UAV may include sensors, lights, cameras, propulsion mechanisms, or a combination thereof that are permanently coupled to the UAV. As a result, replacement of certain components of the UAV may be difficult or cost prohibitive. Similarly, due to permanent coupling of components to the UAV, the components may hinder storage of the UAV when not in operation. For example, a light or camera system may be coupled to the UAV and substantially rigid, thereby preventing portions of the UAV (e.g., a propulsion mechanism) from folding and/or collapsing.

The present teachings provide embodiments of a UAV which address the aforementioned challenges as described in further detail below. The UAV as described herein may advantageously be less complex mechanically when compared to conventional UAVs. Additionally, the UAV embodiments described herein may provide for removably coupling attachments to the UAV to facilitate ease of connection and/or disconnection of the attachments. Similarly, the UAV embodiments described herein may facilitate interchangeability of the attachments to further customize the UAV and functionality thereof. As such, the UAV embodiments described herein may facilitate upgradeability of the attachments. For example, the UAV may facilitate interchanging of the attachments such that an attachment may be replaced with an upgraded attachment (e.g., updated and/or newer componentry within the replacement attachment, improved packaging of the replacement attachment, etc.) Moreover, the UAV may have improved packaging (e.g., foldability and/or collapsibility) due to easy disconnection of attachments from the UAV. For example, to store the UAV, one or more attachments may be disconnected from the UAV and stored separately, thereby decreasing the overall packaging space of the UAV when not in use.

Figure 1:
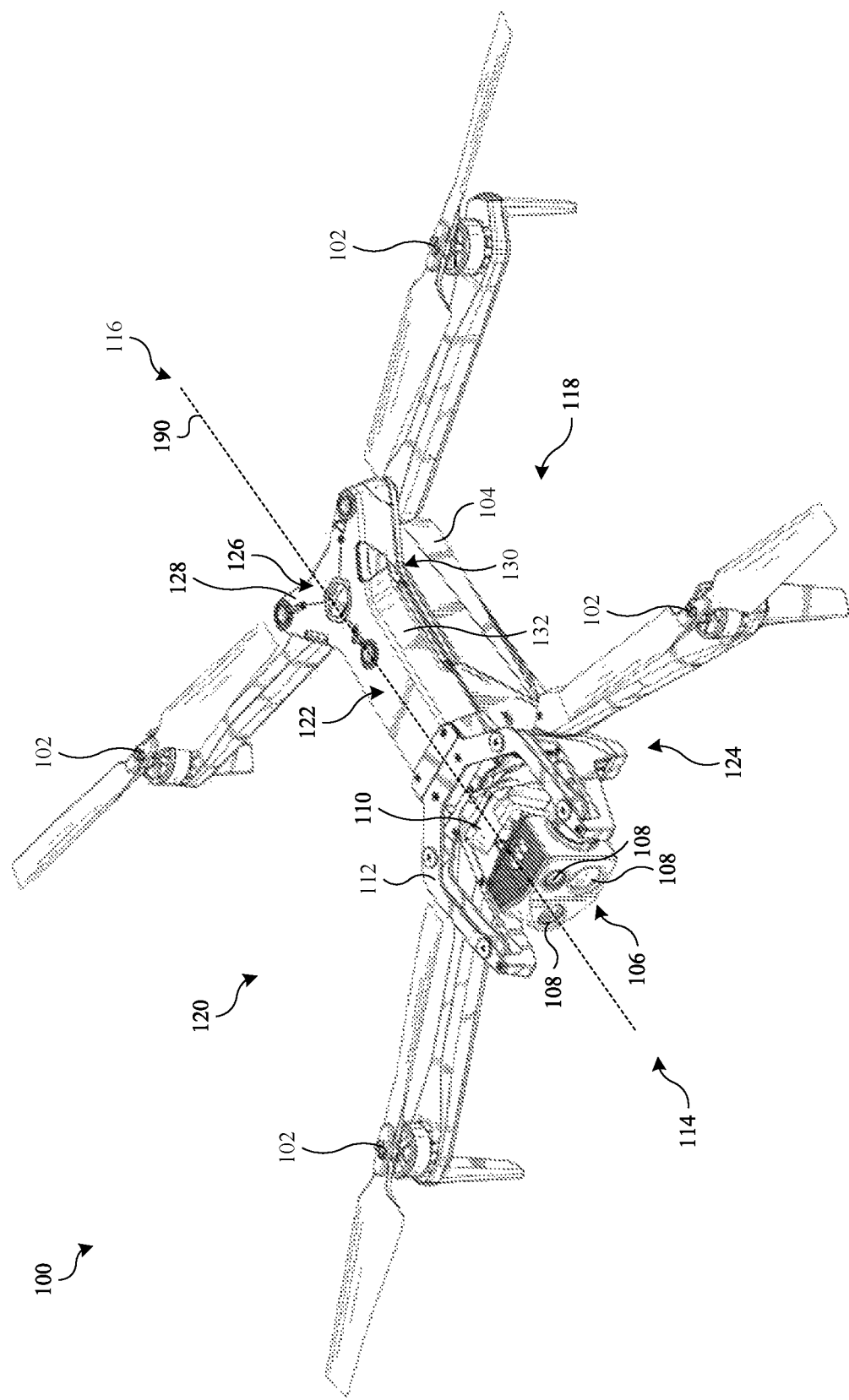
FIG. 1 is a top perspective view of an exemplary UAV.
Figure 2:
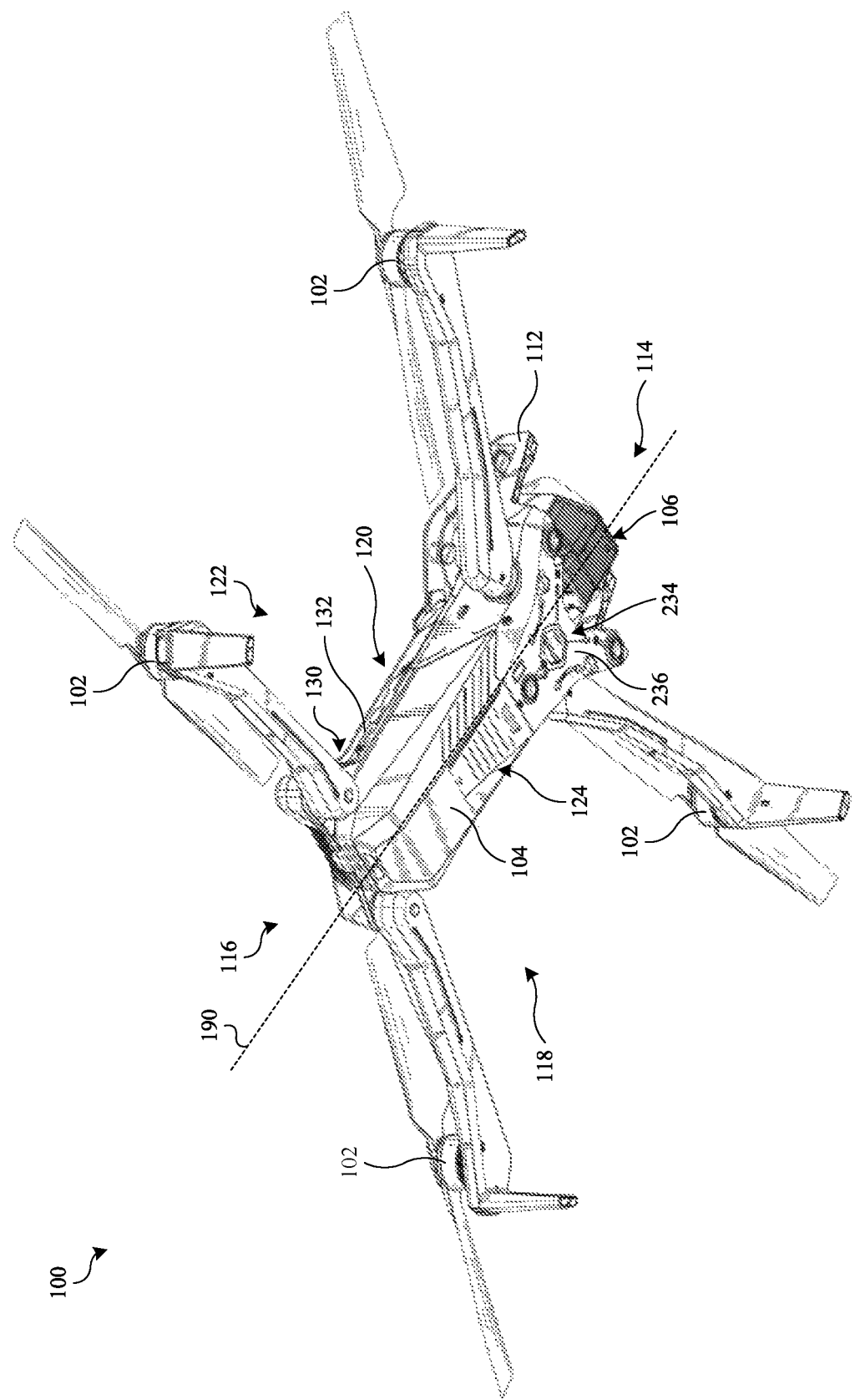
FIG. 2 is a bottom perspective view of the UAV of FIG. 1.

Turning now to the figures, FIG. 1 illustrates a top perspective view of an unmanned aerial vehicle (UAV) 100. FIG. 2 illustrates a bottom perspective view of the UAV 100.

The UAV 100 may include one or more propulsion mechanisms 102 and a power source, such as a battery coupled to the UAV 100. The UAV 100 may be configured for autonomous landing and/or docking with a docking station. To support the autonomous landing and/or docking, the UAV 100 may follow any suitable processes or procedures, or may include one or more components, such as those described in U.S. application Ser. No. 16/991,122, filed Aug. 12, 2020, and U.S. Provisional Application No. 63/527,261, filed on Jul. 17, 2023, the entire disclosures of which are hereby incorporated by reference for all purposes.

The propulsion mechanisms 102 may include any components and/or structures suitable for supporting flight of the UAV 100. For example, as shown in FIGS. 1 and 2, the propulsion mechanisms 102 may be or may include propeller assemblies having one or more blades connected to hubs of the UAV 100. The one or more blades may be propelled by a motor to rotate the one or more blades and facilitate flight of the UAV 100, whereby the motor may be powered by a power source of the UAV 100, such as the battery 104. It should be appreciated, however, that the configuration and/or structure of the UAV 100 may vary depending on the particular configuration of the UAV 100, and as such, the UAV 100 shown in FIG. 1 is not intended to limit the structure of the UAV 100.

As mentioned above, the UAV 100 may be configured using various processes or protocols to autonomously land (e.g., on a docking station), to autonomously take flight (e.g., from a docking station), or both. To facilitate autonomous landing and/or autonomous flight, the UAV 100 may include one or more sensors, such as image sensors, that are configured to monitor a position of the UAV 100 and/or detect a specified image, such as a fiducial disposed on a docking station. For example, during a landing sequence (e.g., a docking sequence) of the UAV 100, the image sensors of the UAV 100 may detect an image, such as the fiducial disposed on the docking station, to properly align and guide the UAV 100 to dock.

The UAV 100 may further include a camera system 106. The camera system 106 may be configured to detect, monitor, capture, record, or a combination thereof one or more images. The camera system 106 may be configured to facilitate autonomous or user-controlled flight of the UAV 100. For example, the camera system 106 may include one or more cameras 108. The cameras 108 may capture a live feed of an environment during flight, whereby a user via a user interface (e.g., a controller) may control the UAV 100 based upon the live feed of the environment. Alternatively, or additionally, the cameras 108 may capture images of the environment and/or monitor the environment in real-time to autonomously fly through the environment. It should be noted that the cameras 108 and the camera system 106 are not limited to any particular configuration, and any types of camera configurations (e.g., wide-angle, high-resolution, etc.) may be implemented in the UAV 100.

The camera system 106 may be operable via a gimbal system 110 coupled to the camera system 106. The gimbal system 110 may be configured to be controlled autonomously or via a user interface (e.g., a controller) to orient or otherwise move the camera system 106 (e.g., the cameras 108) relative to the UAV 100. The gimbal system 110 may include one or more arms and one or more pivot joints that facilitate movement of the camera system 106 relative to the UAV 100.

The gimbal system 110 and the camera system 106 may be coupled to the UAV 100 by a mounting bracket 112. The mounting bracket 112 may be coupled to the UAV 100 by one or more fasteners or other mechanical connection means to secure the gimbal system 110 and the camera system 106 to the UAV 100. The mounting bracket 112 may be coupled to any portion of the UAV 100. By way of example, as shown in FIGS. 1 and 2, the mounting bracket 112 may be coupled to a front 114 (i.e., a front side) of the UAV 100 or a top 122 (i.e., a top side) of the UAV 100 such that the camera system 106 may be positioned in the front 114 of the UAV 100.

That is, the camera system 106 may be located at the front 114 (i.e., the front side) of the UAV 100 so that the cameras 108 may capture an environment in front of the UAV 100 with respect to a forward direction of travel of the UAV 100 (e.g., a direction of travel of the UAV 100 that is substantially parallel to the ground or along the ground). However, in certain configurations, the camera system 106 may also be coupled to another portion of the UAV 100, such as a rear 116 (i.e., rear side) of the UAV 100, a first side 118 of the UAV 100, a second side 120 of the UAV 100, a bottom 124 (i.e., a bottom side) of the UAV 100, or a combination or variation thereof.

As discussed in further detail below, one or more attachments may be coupled to the UAV 100 and operable with the UAV 100 to further customize a user experience of the UAV 100. That is, the one or more attachments may be coupled to the UAV 100 to provide additional functionality to the UAV 100. For example, the one or more attachments may be a global positioning system (GPS) attachment, a microphone and/or speaker attachment, a night vision attachment (e.g., infrared (IR) attachment), a spotlight attachment, a secondary power source attachment (e.g., a secondary battery similar to the battery 104), an antenna or other radio accessory, a secondary camera system similar to or different from the camera system 106, a computer module, or a combination thereof. Thus, it is envisioned that any type of attachments or arrangement of multiple attachments may be configured for securement to the UAV 100. Additionally, as discussed in further detail below, the UAV 100 or a system thereof may be dynamic such that one or more characteristics (e.g., features, functionalities, operations, etc.) of the UAV 100 may be automatically and dynamically adjusted based upon a type of attachment coupled to the UAV 100.

To facilitate coupling one or more attachments to the UAV 100, the UAV 100 may include one or more attachment interfaces. As shown in FIGS. 1 and 2, the UAV 100 may include a plurality of attachment interfaces located on the UAV 100. For example, the UAV 100 may include a top attachment interface 126 located on the top 122 (i.e., the top side) of the UAV 100, a side attachment interface 130 located on the first side 118 of the UAV 100, a side attachment interface 130 located on the second side 120 of the UAV 100 that opposes the first side 118, and a bottom attachment interface 234 located on the bottom 124 (i.e., the bottom side) of the UAV 100.

To further illustrate positioning of such attachment interfaces, as shown in FIGS. 1 and 2, the UAV 100 (e.g., a body of the UAV 100 from which the propulsion mechanisms 102 extend) may extend along a longitudinal axis 190 of the UAV 100 from the front 114 of the UAV 100 to the rear 116 of the UAV 100. That is, the UAV 100 may extend from a first end (e.g., the front 114, which may be considered a forward end of the UAV 100) to an opposing second end (e.g., the rear 116, which may be considered an aft end of the UAV 100) along the longitudinal axis 190, whereby a length of the UAV 100 or a body thereof may be measured from the first end to the second end.

Moreover, the first side 118 of the UAV 100 may oppose the second side 120 of the UAV 100 with respect to the longitudinal axis 190. The first side 118 and second side 120 may be located on opposing sides of the longitudinal axis 190. The first side 118 may be considered a port side of the UAV 100 and the second side 120 may be considered a starboard side of the UAV 100.

Based on the above relative orientations, it can be seen in FIGS. 1 and 2 that the attachment interfaces described above may be positioned in various locations with respect to the longitudinal axis 190 of the UAV 100. For example, the top attachment interface 126 and/or the bottom attachment interface 234 may be located on the top 122 (i.e., the top side) of the UAV 100 and may extend along the longitudinal axis 190 between the first end (e.g., the front 114 or forward end) and the second end (e.g., the rear 116 or aft end) of the UAV 100. Additionally, the side attachment interfaces 130 may be located on the first side 118 and the second side 120 of the UAV 100 such that the side attachment interfaces 130 may be located on opposing sides of the longitudinal axis 190. That is, a first one of the side attachment interfaces 130 may be located on the port side (e.g., the first side 118) of the UAV 100 and a second one of the side attachment interfaces 130 may be located on the starboard side (e.g., the second side 120) of the UAV 100 such that the side attachment interfaces 130 are located on opposing sides of the longitudinal axis 190.

It should be noted that the above relative orientations associated with the UAV 100 are provided for illustrative purposes and should not be construed as limiting the teachings herein. For example, although the front 114 of the UAV 100 may be considered the front end of the UAV 100 and the rear 116 of the UAV 100 may be considered the aft end of the UAV 100, such considerations do not mean that the UAV 100 only travels in a forward direction with the front 114 of the UAV 100 leading the travel. That is, the UAV 100 may travel in any direction (e.g., fore, aft, side-to-side between the port and starboard sides, in an elevational direction, etc.) with respect to the longitudinal axis 190.

Turning now back to the attachment interfaces, it should be noted that such attachment interfaces may be integrated into the UAV 100, such as a housing of the UAV 100, or may be connected to the UAV 100 to allow for attachment of various attachments. That is, the attachment interfaces may provide a connection means to easily and removably couple various attachments to the UAV 100.

By way of example, the top attachment interface 126 may include a top attachment surface 128. The top attachment surface 128 may be located on, or formed with, the top (i.e., the top side) of the UAV 100. The top attachment surface 128 may be configured to receive, support, or otherwise couple to—either directly or indirectly—various attachments. Similarly, the side attachment interfaces 130 may include a side attachment surface 132 located on, or formed with, the first side 118 and/or the second side 120 of the UAV 100. Moreover, the bottom attachment interface 234 may include a bottom attachment surface 236 located on, or formed with, the bottom 124 (i.e., the bottom side) of the UAV 100. Any number of these attachment surfaces may exist for any of the attachment interfaces. That is, an attachment interface may include more than one attachment surface (e.g., a first attachment surface and a second attachment surface).

Based on the above, one or more attachments may be coupled to the top 122 of the UAV 100, the bottom 124 of the UAV 100, the first side 118 of the UAV 100, the second side 120 of the UAV 100, or a combination thereof. Additionally, it is envisioned that the front 114 and/or the rear 116 of the UAV 100 may also in certain configurations include an additional attachment interface. For example, in certain configurations the UAV 100 may remove the camera system 106 from the front 114 of the UAV and couple the camera system 106 to the UAV 100 in another location (e.g., the rear 116). In such a configuration, the front 114 may include an attachment interface for further attachments.

It should also be noted that the attachment interfaces of the UAV 100 may be adapted for universal or common attachment techniques. That is, various types of attachments may be coupled to the same attachment interface. For example, the GPS attachment and the night vision attachment may both be configured to attach to the top attachment interface 126 and the bottom attachment interface 234. Additionally, more than one attachment may be coupled to the UAV 100 at one time and may be powered by the power source (e.g., the battery 104) of the UAV 100. For example, a first attachment (e.g., a GPS attachment) may be coupled to the top attachment interface 126 and a second attachment (e.g., a spotlight attachment) may be coupled to the side attachment interface 130 located on the first side 118 of the UAV 100. Moreover, the attachment interfaces may include one or more additional features, such as heat-sinking components or other cooling components. Based on the above, various configurations and customization may be possible based on the teachings herein.

Figure 3A:
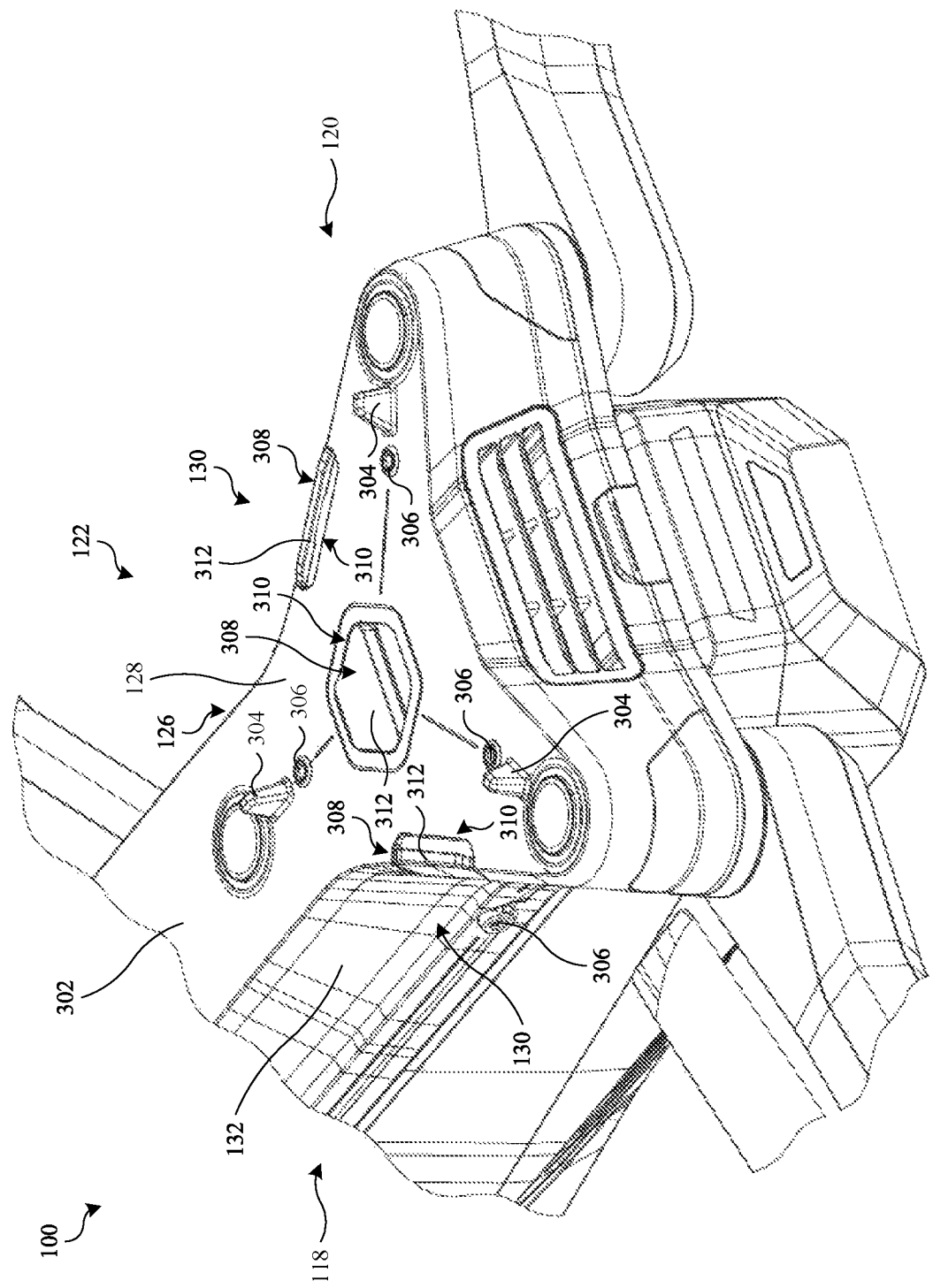
FIG. 3A is a close-up perspective view of the UAV of FIG. 1.
Figure 3B:
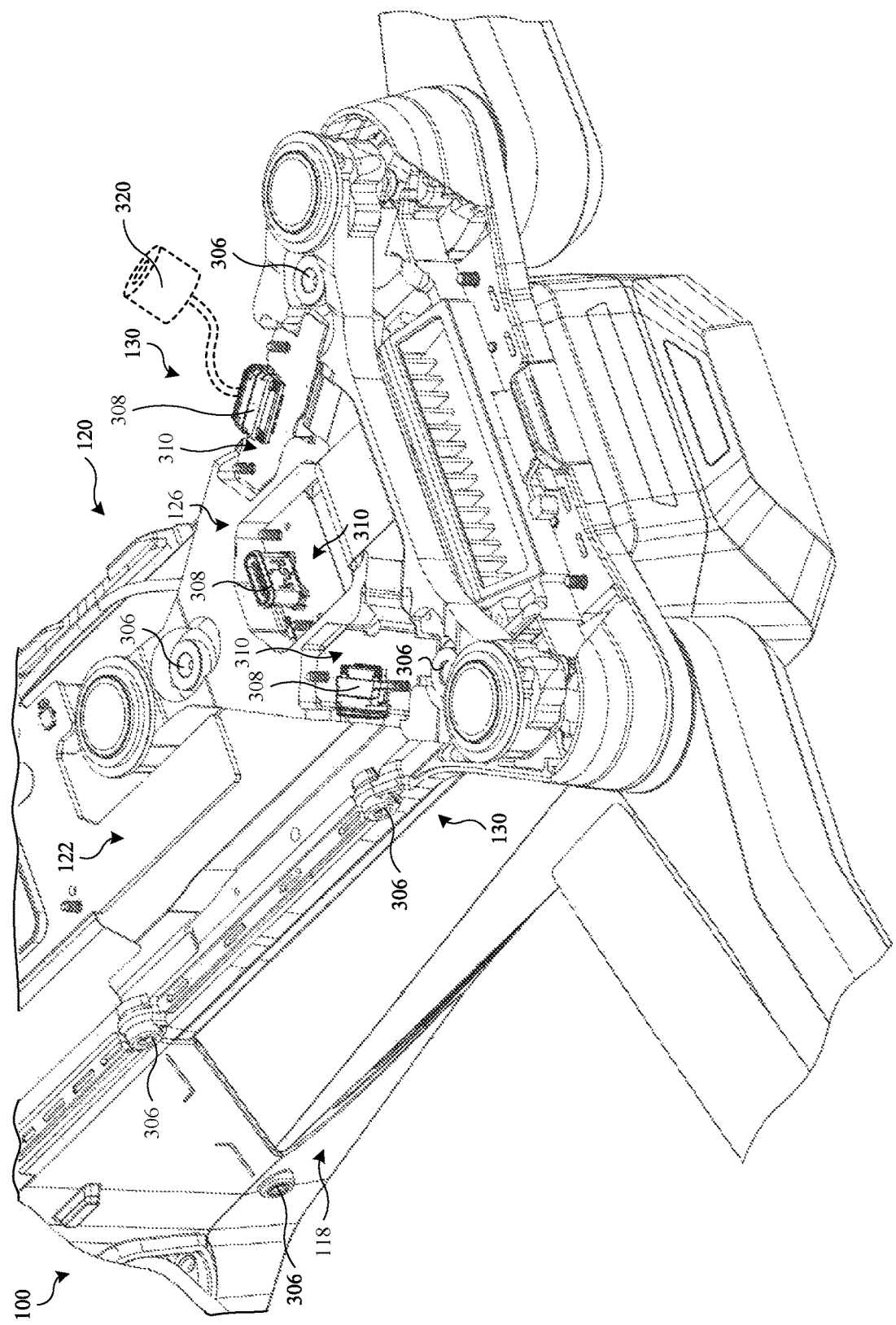
FIG. 3B is the close-up perspective view of FIG. 3A having a housing of the UAV removed.

FIG. 3A illustrates a close-up perspective view of the UAV 100 of FIG. 1. FIG. 3B illustrates another close-up perspective view of the UAV 100 of FIG. 1 with a housing 302 of the UAV 100 removed for further illustration. As discussed above, the UAV 100 may include one or more attachment interfaces, such as the top attachment interface 126 located on the top 122 (i.e., the top side) of the UAV 100 and the side attachment interface 130 located on the first side 118 of the UAV 100, as shown in FIGS. 3A and 3B.

The attachment interfaces (e.g., the top attachment interface 126, the side attachment interfaces 130, the bottom attachment interface 234, etc.) of the UAV 100 may be coupled to or formed with a portion of the UAV 100. By way of example, as discussed above, the attachment interfaces may include an attachment surface configured to receive or otherwise couple to the various attachments. For example, the top attachment interface 126 may include the top attachment surface 128 and the side attachment interface 130 of the first side 118 of the UAV 100 may include the side attachment surface 132.

Such attachment surfaces may be coupled to the housing 302 of the UAV 100 or may integrally formed with the housing 302. That is, the housing 302 may be considered an outer shell or outer casing of the UAV 100 that defines one or more interior compartments of the UAV 100, whereby the interior compartments may substantially contain various components (e.g., electrical components, mechanical components, etc.) of the UAV 100. As shown in FIG. 3A, the top attachment surface 128 may be formed with—or form a portion of—a top portion (e.g., surface) of the housing 302 located on the top 122 of the UAV 100. Similarly, the side attachment surface 132 may be formed with—or form a portion of—a first side (e.g., surface) of the housing 302 located on the first side 118 of the UAV 100. Therefore, the attachments may be coupled directly or indirectly to the housing 302 of the UAV 100 via the attachment surfaces.

To facilitate such coupling of various attachments, the top attachment interface 126 may include one or more projections 304. The projections 304 may be configured to align an attachment with the top attachment surface 128. For example, the projections 304 may define a perimeter, such as a perimeter of the top attachment surface 128 or a portion thereof, whereby the attachment may be coupled to the top attachment surface 128 such that the attachment is located within and/or along the perimeter. That is, the attachment may be encompassed by the perimeter.

Similarly, the projections 304 may aid with alignment between an attachment and the top attachment surface 128. For example, as described in further detail below, the attachments may be coupled to the top attachment surface 128 using one or more fasteners. The projections 304 may aid in aligning an attachment with mounting holes 306 of the top attachment interface 126 so that the one or more fasteners may extend through the attachment and into respective ones of the one or more fasteners. That is, the mounting holes 306 may be positioned within (e.g., encompassed by) the perimeter defined by the projections 304 so that, when the attachment is located within (e.g., encompassed by) the perimeter, the mounting holes 306 align with the attachment to facilitate coupling the attachment to the top attachment surface 128.

The projections 304 are not limited to any particular size or shape. The projections 304 may extend away from the top attachment surface 128 and/or away from the UAV 100. The projections 304 may extend generally orthogonally to the top attachment surface 128 or may at any angle with respect to the top attachment surface 128. The projections 304 may have any geometry so facilitate guiding and/or locating the attachments with respect to the top attachment surface 128. For example, the projections 304 may each include a tapered surface, whereby the tapered surfaces of the projections 304 converge toward one another (e.g., converge toward a center region of the perimeter defined by the projections 304).

As discussed above, the top attachment interface 126 may be configured to mechanically couple various attachments to the UAV 100. The attachments may be advantageously coupled to the top attachment surface 128 in a removably manner to facilitate interchangeability, removal, and replacement of the attachments. In addition to mechanically coupling the various attachments to the UAV 100, the top attachment surface 128 may also electrically couple the various attachments to the UAV 100.

The top attachment interface 126 may include one or more connector ports 308. The connector ports 308 may be located on, or formed in, the top attachment surface 128. The connector ports 308 may be configured to receive an electrical connector of the various attachments. For example, the connector ports 308 may be configured to receive a universal serial bus (USB) connector, such as a USB-C connector of the attachments. However, the connector ports 308 may be configured to receive any type of connector, such as USB-A, USB-B, micro-USB, mini-USB, high-definition multimedia interface (HDMI), audio jack, the like, or a combination thereof.

The connector ports 308 may be configured to electrically couple the various attachments to the UAV 100. That is, an electrical system of the various attachments may be in communication with the electrical system of the UAV 100. As such, the various attachments may be configured to communicate (e.g., transmit) information to the UAV 100, such as intrinsic information pertaining to the various attachments. Similarly, the UAV 100 may communicate (e.g., transmit) information to the various attachments. Additionally, the various attachments, via the connector ports 308, may be powered by a power source of the UAV 100, such as the battery 104. Thus, the various attachments may interface with the UAV 100 such that the attachments may be operable in conjunction with the UAV 100.

The connector ports 308 of the top attachment interface 126 may be positioned anywhere along the top attachment surface 128 or another surface of the UAV 100. The connector ports 308 may project from the top attachment interface 126 or may be recessed from the top attachment interface 126. For example, the connector ports 308 may be positioned in a recess 310 defined by the top attachment surface 128 or another surface of the UAV 100. As such, an outermost surface of the connector ports 308 may be recessed from the top attachment surface 128. It should also be noted that any number of connector ports 308 and/or recesses 310 may be located on the top attachment surface 128.

The connector ports 308 may also be protected by a cover 312 when not in use by an attachment. The cover 312 may prevent moisture, debris, debris, dust, dirt, other potential contaminants, or a combination thereof from entering the connector ports 308. The cover 312 may be removable or otherwise repositionable to facilitate coupling the connector of an attachment to the connector ports 308. The cover 312 may be used for more than one of the connector ports 308 or each of the connector ports 308 may have their own one of the covers 312. It should also be noted that the in addition to, or in lieu of, the cover 312, one or more of the connector ports 308 may also be protected by other types of weather-proofing, such as a gasket, a foam material, a sealant material, or a combination thereof.

In addition to the top attachment interface 126 described above, the UAV 100 may also include the side attachment interfaces 130 shown in FIGS. 3A and 3B. A first of the side attachment interfaces 130 may be located on the first side 118 of the UAV 100 and a second of the side attachment interfaces 130 may be located on the second side 120 of the UAV 100. The first of the side attachment interfaces 130 may include the side attachment surface 132 which may be coupled to, or integrally formed with, the first side 118 of the UAV 100 (e.g., coupled to or integrally formed with a portion of the housing 302 on the first side 118 of the UAV 100). Similarly, the second of the side attachment interfaces 130 may include the side attachment surface 132 which may be coupled to, or integrally formed with, the second side 120 of the UAV 100 (e.g., coupled to or integrally formed with a portion of the housing 302 on the second side 120 of the UAV 100). Thus, various attachments may be coupled to the first side 118 and/or the second side 120 of the UAV 100 in a similar or different manner compared to the top attachment interface 126.

By way of example, the side attachment interfaces 130 may include additional ones of the mounting holes 306 that may be located on the side attachment surfaces 132. The mounting holes 306 may be the same or different than the mounting holes 306 of the top attachment surface 128. For example, the mounting holes 306 of the side attachment interfaces 130 may be configured to receive fasteners (e.g., threaded fasteners) to couple the attachments to the side attachment surfaces 132. As such, a location of the mounting holes 306 and/or a geometry of the mounting holes 306 is not particularly limited.

The side attachment interfaces 130 may also include one or more of the connector ports 308. The connector ports 308 may be located on the side attachment surfaces 132. Alternatively, or additionally, the connector ports 308 may be located on another surface of the UAV 100, such as the top attachment surface 128. Thus, all or a portion of the connector ports 308 located on the top attachment surface 128 may be considered part of the top attachment interface 126 and/or the side attachment interfaces 130, thereby providing further flexibility when coupling attachments to the UAV 100.

For example, the top attachment surface 128 may include a plurality of the connector ports 308, whereby a centrally located one of the connector ports 308 may be positioned within (e.g., encompassed by) the perimeter of the projections 304 and configured to couple an attachment to the top attachment surface 128. Additionally, the top attachment surface 128 may include another pair of the connector ports 308 positioned outside of the perimeter of the projections 304. The pair of the connector ports 308 may be located on the top attachment surface 128 and be positioned adjacent to the side attachment surfaces 132. As such, the connector ports 308 may be configured to electrically couple an attachment, such as the attachment 320, to the UAV 100 so that the attachment 320 may be mechanically (e.g., removably) coupled to the side attachment surface 132 located on the first side 118 and/or the second side 120.

Figure 4:
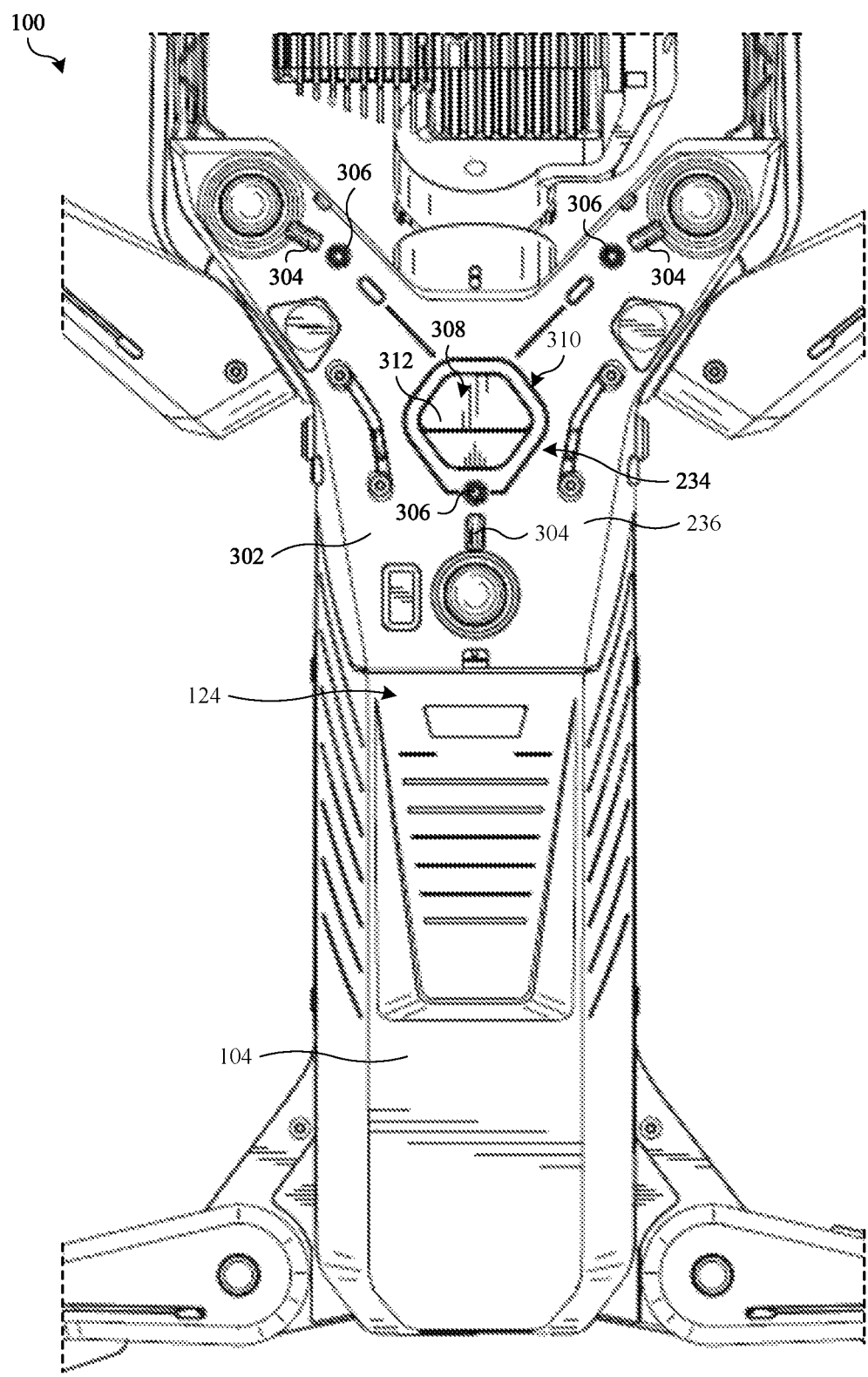
FIG. 4 is a close-up view of another attachment interface of the UAV of FIG. 1.

Based on the above, attachments such as the attachment 320 may be mechanically and/or electrically coupled to the first side 118, the second side 120, and the top 122 (i.e., the top side) of the UAV 100. Additionally, as shown in the close-up view of FIG. 4, the UAV 100 may also include the bottom attachment interface 234 to mechanically and/or electrically couple attachments to the bottom 124 (i.e., the bottom side) of the UAV 100.

As discussed above, the bottom attachment interface 234 may include the bottom attachment surface 236. The bottom attachment surface may be coupled to, or located on the bottom 124 (i.e., the bottom side) of the UAV 100. For example, the bottom attachment surface 236 may be coupled to, or integrally formed with, a portion of the housing 302 of the UAV 100 located on the bottom 124 of the UAV 100. The bottom attachment surface 236 may be positioned adjacent to and/or may abut the battery 104 of the UAV 100 so that an attachment coupled to the bottom attachment surface 236 may be free of obstruction of the battery 104.

The bottom attachment interface 234 may include one or more of the projections 304. The projections 304 of the bottom attachment interface 234 may be located on the bottom attachment surface 236. The projections 304 of the bottom attachment interface 234 may be similar to the projections 304 of the top attachment interface 126 as described above. For example, the projections 304 of the bottom attachment interface 234 may define a perimeter around or on the bottom attachment surface 236, whereby an attachment may be configured to be aligned and located within (e.g., encompassed by) and/or along the perimeter to couple the attachment to the bottom attachment surfaces 236 via one or more fasteners extending into mounting holes 306 of the bottom attachment interface 234. The mounting holes 306 may be similar to the mounting holes 306 described above.

The bottom attachment interfaces 234 may also electrically couple various attachments to the UAV 100 via another one of the connector ports 308 located on the bottom attachment surface 236. The connector port 308 of the bottom attachment interface 234 may be positioned within (e.g., encompassed by) the perimeter of the projections 304. For example, the mounting holes 306 may be located within (e.g., encompassed by) the perimeter of the projections 304 adjacent to the projections 304 and the connector port 308 may be located centrally within the perimeter of the projections 304. It should be noted that the connector port 308 may be similar to the connector ports 308 described above with respect to the top attachment interface 126 and the side attachment interfaces 130. For example, the connector port 308 of the bottom attachment interface 234 may be configured to receive a USB-C connector of an attachment.

The connector port 308 may be located anywhere along the bottom attachment surface 236. For example, the bottom attachment surface 236 may define a recess 310 similar to the recess 310 of the top attachment interface 126, whereby the connector port 308 may be located within the recess 310 of the bottom attachment surface 236. Thus, an attachment may be in electrical communication with the UAV 100 and may be powered by a power source of the UAV 100, such as the battery 104.

Figure 5:
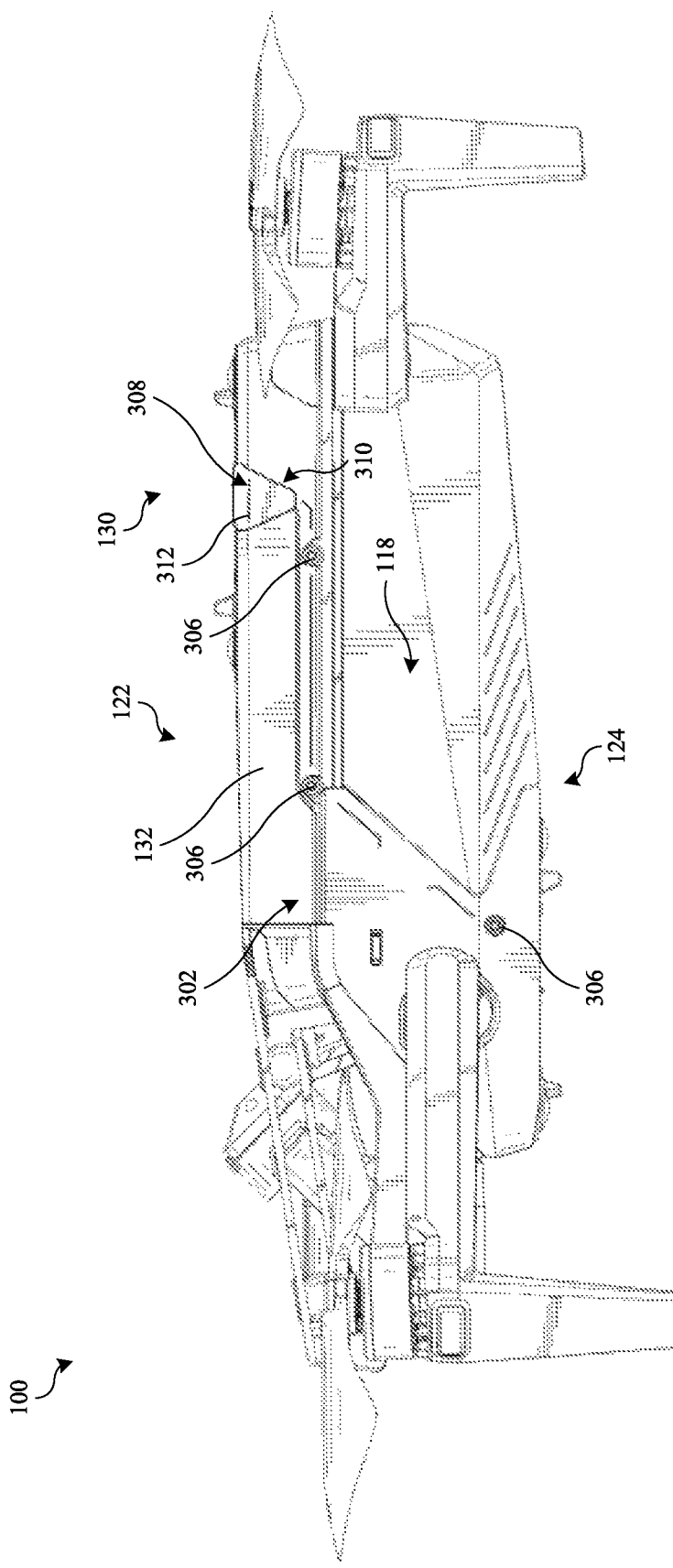
FIG. 5 is a side view of the UAV of FIG. 1

FIG. 5 illustrates a side view of the UAV 100 to further illustrate the side attachment interface 130 located on the first side 118 of the UAV 100. As described above, the side attachment interface 130 of the first side 118 may include the side attachment surface 132. The side attachment surface 132 may be coupled to, or formed with, a portion of the housing 302 that is located on the first side 118 of the UAV 100.

The side attachment interface 130 of the first side 118 may also include the mounting holes 306 located along the side attachment surface 132. The mounting holes 306 may be located anywhere along the side attachment surface 132 to removably couple attachments, such as the attachment 320 described above, to the first side 118. The side attachment interface 130 of the first side 118 may also include the connector port 308 to electrically couple attachments to the UAV 100. The connector port 308 may be located in the recess 310, whereby the recess 310 may be defined by the top attachment surface 128 and/or the side attachment surface 132 of the first side 118 (see FIGS. 3A and 3B). Based on the above configuration, an attachment, such as the attachment 320, may be coupled to the first side 118 of the UAV 100 and be free of obstruction of operation of the UAV 100 (e.g., the propulsion mechanisms 102 and/or the camera system 106 of the UAV 100).

Figure 6:
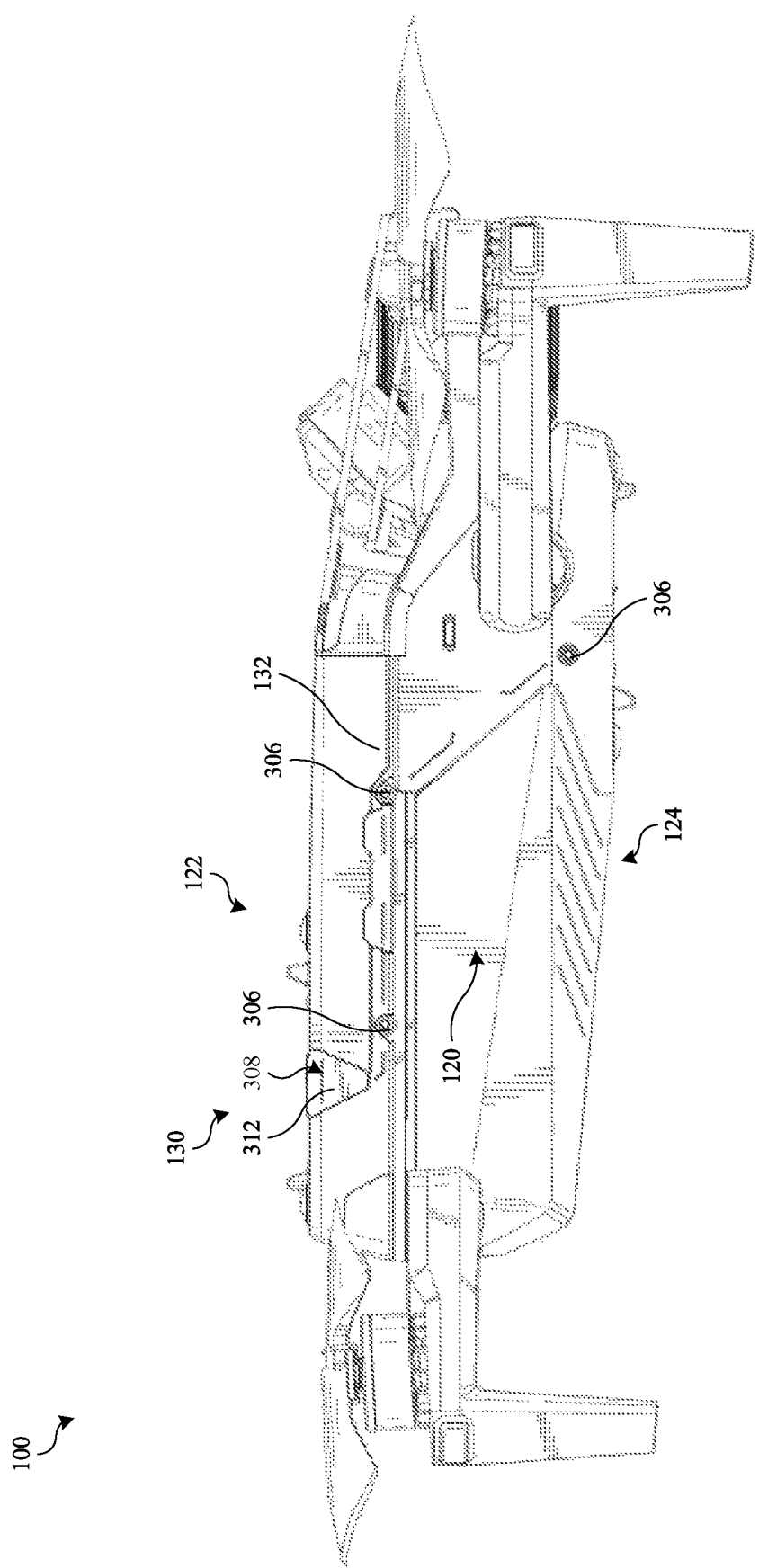
FIG. 6 is another side view of the UAV of FIG. 1.

FIG. 6 illustrates a side view of the UAV 100 to further illustrate the side attachment interface 130 located on the second side 120 of the UAV 100. As described above, the side attachment interface 130 of the second side 120 may include the side attachment surface 132. The side attachment surface 132 may be coupled to, or formed with, a portion of the housing 302 that is located on the second side 120 of the UAV 100. The side attachment interface 130 located on the second side 120 may directly oppose the side attachment interface 130 located on the first side 118. That is, the side attachment interface 130 located on the second side 120 may be symmetrically opposite to the side attachment interface 130 located on the first side 118 or may differ in configuration.

The side attachment interface 130 of the second side 120 may also include the mounting holes 306 located along the side attachment surface 132. The mounting holes 306 may be located anywhere along the side attachment surface 132 to removably couple attachments, such as the attachment 320 described above, to the second side 120. The side attachment interface 130 of the second side 120 may also include the connector port 308 to electrically couple attachments to the UAV 100. The connector port 308 may be located in the recess 310, whereby the recess 310 may be defined by the top attachment surface 128 and/or the side attachment surface 132 of the second side 120. Based on the above configuration, an attachment, such as the attachment 320, may be coupled to the second side 120 of the UAV 100 and be free of obstruction of operation of the UAV 100 (e.g., the propulsion mechanisms 102 and/or the camera system 106 of the UAV 100).

Figure 7A:
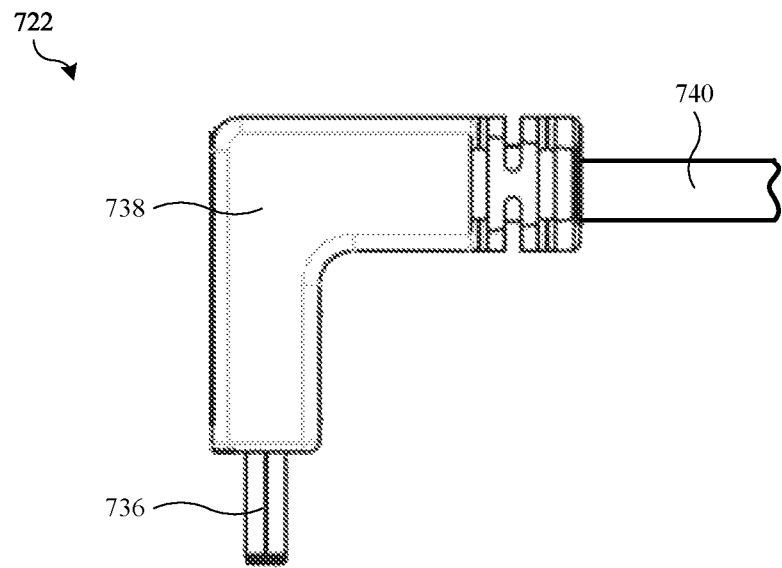
FIG. 7A is a side view of a connector of an attachment for a UAV.
Figure 7B:
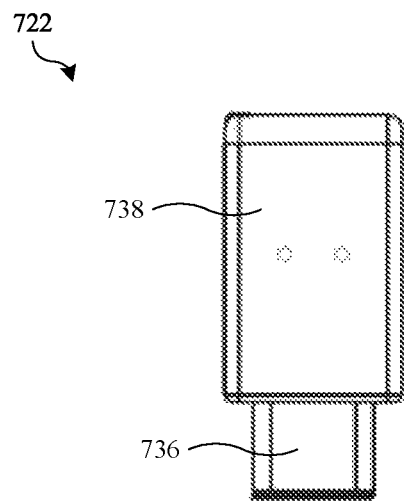
FIG. 7B is a top view of the connector of FIG. 7A.

FIG. 7A illustrates a side view of a connector 722 of an attachment. FIG. 7B illustrates a top view of the connector 722. As discussed above, the various attachments configured to be removably coupled to the UAV 100 may be electrically coupled to one or more of the connector ports 308 by a connector, such as the connector 722.

The connector 722 may include an insertion portion 736 that is configured to be inserted into one of the connector ports 308 (e.g., one of the connector ports 308 of the top attachment interface 126, the side attachment interfaces 130, the bottom attachment interfaces 234, or a combination thereof). As discussed above, the connector 722 and thus the insertion portion 736 may be any type of connector that may be received by a respective one of the connector ports 308. For example, the connector 722 may be a USB-C connector configured to be received one of the connector ports 308 configured to receive a USB-C connector. However, the connector 722 may include any electrical connection configuration, such as various pin configurations within the insertion portion 736.

The insertion portion 736 may extend from a connector base 738 of the connector 722. The connector base 738 may provide structurally integrally to the insertion portion 736 and/or may at least partially contain the insertion portion 736. The connector base 738 may be any size, shape, and geometry. For example, the connector base 738 may be substantially linear in shape (e.g., free of bends) or the connector base 738 may contain one or more bends.

As shown in FIG. 7A, the connector base 738 may also include a substantially right-angle (e.g., 90 degree) bend such that the insertion portion 736 may be oriented substantially orthogonal to a portion of the connector base 738. Based on such a configuration, the connector 722 may be oriented in any desired manner (e.g., oriented with a right-angle as described above or any other angle) to facilitate electrically coupling an attachment to the UAV 100.

Such orientation may also alleviate strain on the connector 722, such as wiring 740 of the connector 722, may provide guidance of the connector 722 during electrical coupling to the UAV 100, may improve a user experience during installation of an attachment, or a combination thereof. It should also be noted that the connector 722 may be any size, shape, or dimensions to facilitate such orientation. For example, a portion of the connector base 738 that coupled to the insertion portion 736 may be shorter in length than a length of a portion of the connector base 738 extending substantially orthogonal to the insertion portion 736.

The connector 722 may also include wiring 740 that may be connected an attachment. The wiring 740 is not particularly limited to any type of wiring and/or number of wires. The wiring 740 may be contained within a casing. The wiring 740 may be in electrical communication (e.g., electrically connected) to the insertion portion 736 such that information and/or power may be transferred between the attachment and the UAV 100. It is envisioned that the wiring 740 and/or the connector 722 (e.g., the insertion portion 736 and/or the connector base 738) may also be weatherproofed using, for example, one or more gaskets, a foam material, a sealant material, a conduit, or a combination thereof.

Figure 8:
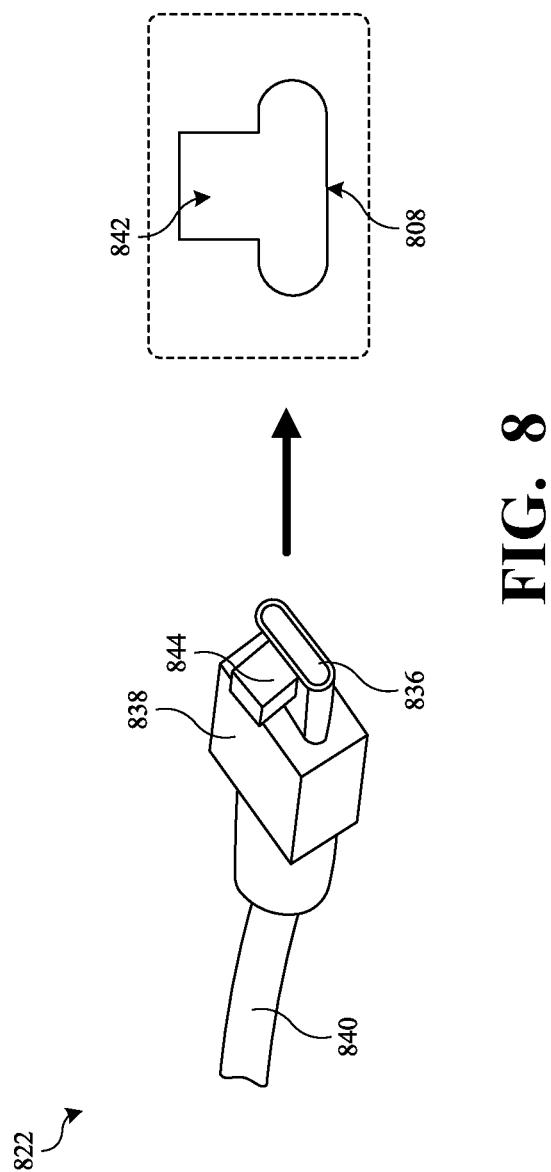
FIG. 8 is a perspective view of a connector of an attachment for a UAV.

FIG. 8 illustrates a perspective view of another example of a connector 822 for an attachment, such as the attachment 320, that may be configured to be received by a connector port 808. The connector 822 may be similar to the connector 722 described above. For example, the connector 822 may include a connector base 838 and wiring 840 that may be similar to the connector base 738 and the wiring 740, respectively. Similarly, the connector port 808 may be similar to the connector ports 308 described above unless otherwise described below. That is, the connector port 808 may be part of the top attachment interface 126, the side attachment interfaces 130, the bottom attachment interface 234, or a combination thereof. As such, the connector port 808 as described below may be used in addition to, or in lieu of, the connector ports 308 described above.

The connector 822 may include an insertion portion 836 that is configured to be received by the connector port 808. The insertion portion 836 may be inserted into the connector port 808 to provide electrical connection between an attachment and the UAV 100.

To aid with electrically coupling an attachment to the UAV 100, the connector port 808 may include a female keying portion 844. The female keying portion 844 may be generally shaped to receive a male keying portion 842 of the connector 822. The male keying portion 842 may be located on, or adjacent to, the insertion portion 836 such that the male keying portion 842 may be located within the confines defined by the female keying portion 844. That is, the male keying portion 842 and the female keying portion 844 may be complimentary in shape.

As a result, other connectors, such as the connector 722, that are free of the male keying portion 842 or include a male keying portion with a different geometry, may be prevented from being inserted into the connector port 808. Thus, connector 822 and the connector port 808 may provide further error-proofing to attachment installation. For example, each of the attachment interfaces described above may have one of the connector ports 808 with a different shape of the female keying portion 844. As a result, only certain attachments with a complimentary shaped one of the male keying portion 842 on its connector 822 may be inserted into a respective one of the connector ports 808.

Figure 9:
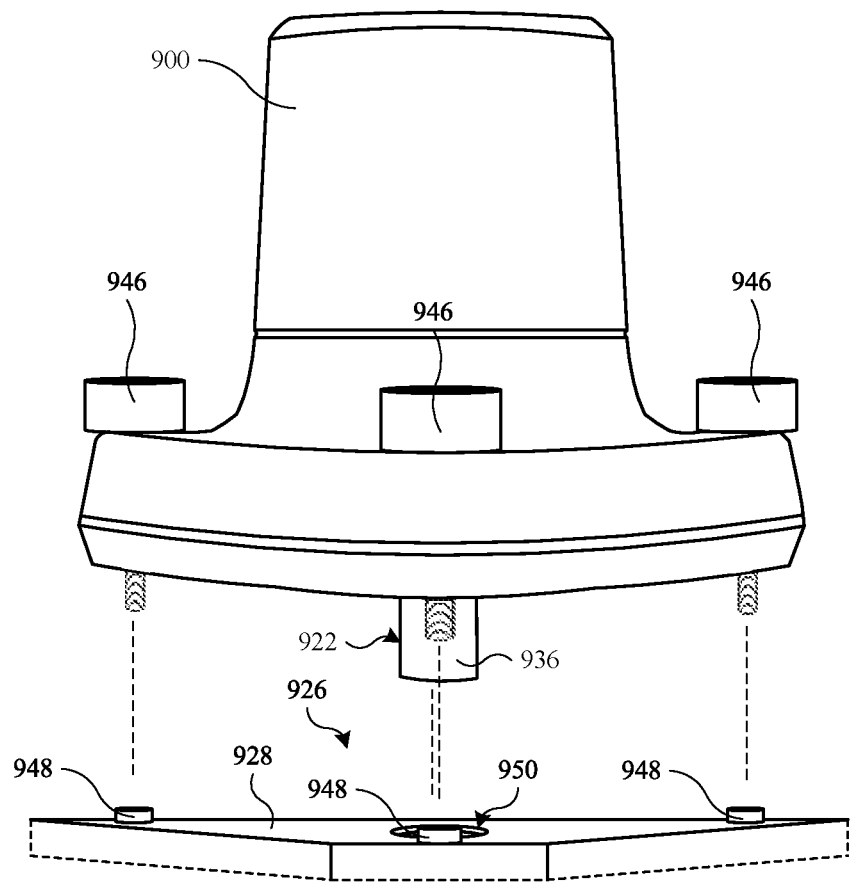
FIG. 9 is a first example of an attachment for a UAV.

FIG. 9 illustrates a first example of an attachment 900. The attachment 900 may be a GPS attachment. The GPS attachment may be configured to determine positional (e.g., locational) information with respect to the UAV 100 to enhance operation (e.g., flight and/or landing) of the UAV 100. Such positional information may be determined using a global positioning system and/or other systems such as, for example, Wi-Fi, Bluetooth, cellular protocols, the like, or a combination thereof. The attachment 900 may vary in size and/or shape and is not limited to the geometry shown in FIG. 9.

The attachment 900 may be configured to be removably coupled to any one of the attachment interfaces described above. For example, the attachment 900 may be configured for removable coupling to the top attachment interface 126 and/or the bottom attachment interface 234. The attachment 900 may include a connector 922 that may be similar to the connector 722 and/or the connector 822 described above. The connector 922 may be formed or directly connected to the attachment 900 (e.g., a housing of the attachment 900). Alternatively, the connector 922 may be connected to the attachment 900 via wiring, such as the wiring 740. Additionally, the attachment 900 may include one or more fasteners 946 to mechanically couple the attachment 900 to the UAV 100. Thus, the attachment 900 may be mechanically and/or electrically coupled to the UAV 100.

To further illustrate mechanically and/or electrically coupling the attachment 900 to the UAV 100, an example of an attachment interface 926 is shown in FIG. 9. The attachment interface 926 may be similar to the top attachment interface 126 and/or the bottom attachment interface 234. However, the attachment interface 926 has been simplified herein (e.g., no projections 304 are illustrated) for illustrative purposes. As such, the coupling described with respect to FIG. 9 may be attributable to coupling the attachment 900 to the top attachment interface 126 and/or the bottom attachment interface 234.

The attachment interface 926 may include an attachment surface 928. The attachment surface 928 may include mounting holes 948 and a connector port 950. To couple the attachment 900 to the attachment surface 928, the fasteners 946 may extend through the attachment 900 (e.g., the housing of the attachment 900) and into the mounting holes 948, thereby mechanically coupling the attachment 900 to the attachment surface 928. Similarly, the connector 922 may include an insertion portion 936 similar to the insertion portion 736 and/or the insertion portion 836 described above, whereby the insertion portion 936 may be inserted into the connector port 950, thereby electrically coupling the attachment 900 to the UAV 100.

Figure 10:
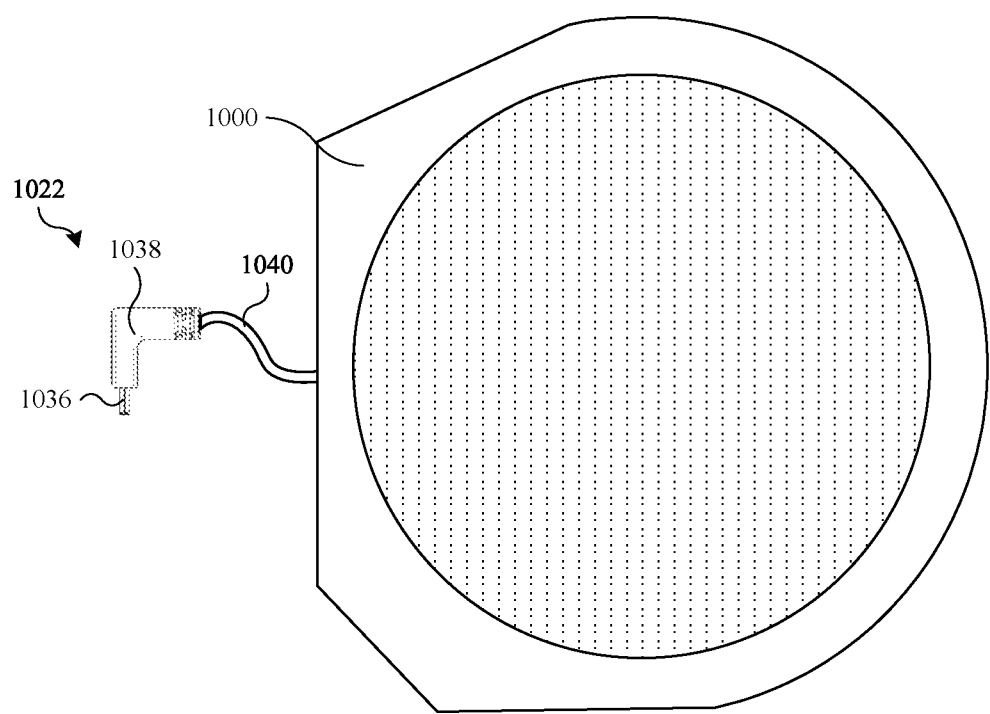
FIG. 10 is a second example of an attachment for a UAV.

FIG. 10 illustrates a second example of an attachment 1000. The attachment 1000 may be a speaker and microphone attachment. The speaker and microphone attachment may be configured to provide two-communication for the UAV 100. That is, the microphone may receive audio messages and relay such messages to a user of the UAV 100 (e.g., via a user interface). Similarly, the use may broadcast messages through the speaker. The attachment 1000 may vary in size and/or shape and is not limited to the geometry shown in FIG. 10.

The attachment 1000 may be configured to be removably coupled to any one of the attachment interfaces described above. For example, the attachment 1000 may be configured for removable coupling to the side attachment interfaces 130. The attachment 1000 may include a connector 1022 that may be similar to the connector 722 and/or the connector 822 described above. The connector 1022 may be formed or directly connected to the attachment 1000 (e.g., a housing of the attachment 1000). Alternatively, the connector 1022 may be connected to the attachment 1000 via wiring, such as the wiring 1040. The wiring 1040 may be in electrical communication with an insertion portion 1036 of the connector 1022 via a connector base 1038. Thus, the attachment 1000 may be electrically connected to the UAV 100.

The attachment 1000 may also be mechanically coupled directly or indirectly to any one of the attachment surfaces, such as the side attachment surfaces 132. Alternatively, or additionally, the attachment 1000 may be coupled indirectly to the UAV 100 via an attachment bracket, as described below. That is, an attachment bracket may be coupled to the attachment 1000 such that the attachment 1000 is coupled to the UAV 100 via the attachment bracket (e.g., the attachment bracket is located between the attachment 1000 and an attachment surface of the one of the attachment interfaces.

Figure 11:
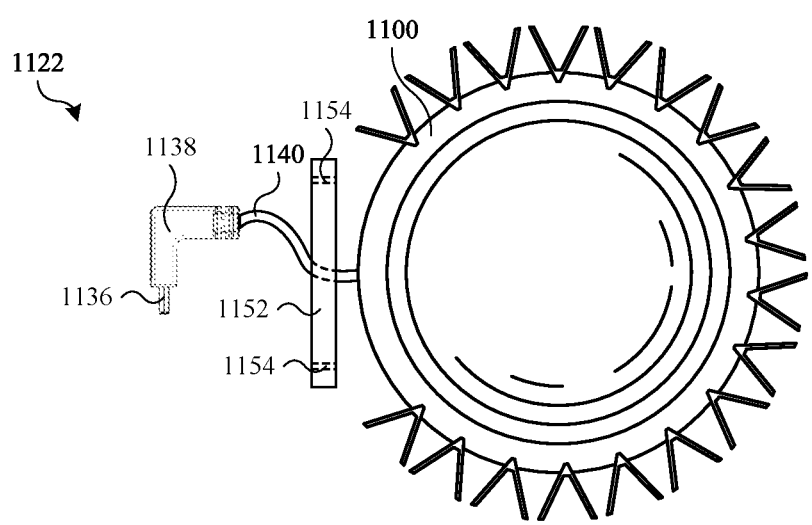
FIG. 11 is a third example of an attachment for a UAV.

FIG. 11 illustrates a third example of an attachment 1100. The attachment 1100 may be a spotlight attachment. The spotlight attachment may be configured illuminate dark environments for the UAV 100 via a high-powered light. The attachment 1100 may vary in size and/or shape and is not limited to the geometry shown in FIG. 11.

The attachment 1100 may be configured to be removably coupled to any one of the attachment interfaces described above. For example, the attachment 1100 may be configured for removable coupling to the side attachment interfaces 130. The attachment 1100 may include a connector 1122 that may be similar to the connector 1022 described above. The connector 1122 may be formed or directly connected to the attachment 1100 (e.g., a housing of the attachment 1100). Alternatively, the connector 1122 may be connected to the attachment 1100 via wiring, such as the wiring 1140. The wiring 1140 may be in electrical communication with an insertion portion 1136 of the connector 1122 via a connector base 1138. Thus, the attachment 1100 may be electrically connected to the UAV 100.

The attachment 1100 may also be mechanically coupled directly or indirectly to any one of the attachment surfaces, such as the side attachment surfaces 132. Alternatively, or additionally, the attachment 1100 may be coupled indirectly to the UAV 100 via an attachment bracket 1152. For example, the attachment bracket 1152 may be coupled to the attachment 1100 and the attachment bracket may be coupled to the UAV 100, such as by one or more fasteners extending through mounting holes 1154 of the attachment bracket 1152 and into the mounting holes 306 of the one of the attachment interfaces. (e.g., the side attachment interfaces 130).

While the attachment bracket 1152 described above may be used to couple the attachment 1100 to the UAV 100, it is envisioned that various mounting techniques may be implemented. Such mounting techniques are not limited to the attachment 1100 and may be implemented in any of the attachments described herein. The attachments may be coupled to the UAV 100 using one or more fasteners as described herein (e.g., bolts, screws, mechanical interlocks, press-fit connections, etc.), one or more brackets, one or more rail systems, other attachment means, or a combination thereof. For example, the attachments and/or the battery 104 may be coupled to the various attachment interfaces via one or more magnets, latching, clips, other locking mechanisms, or a combination thereof. Such mechanical mounting may also include a keying for error-proofing purposes and/or to ensure certain attachments are coupled to the correct attachment interface.

Figure 12:
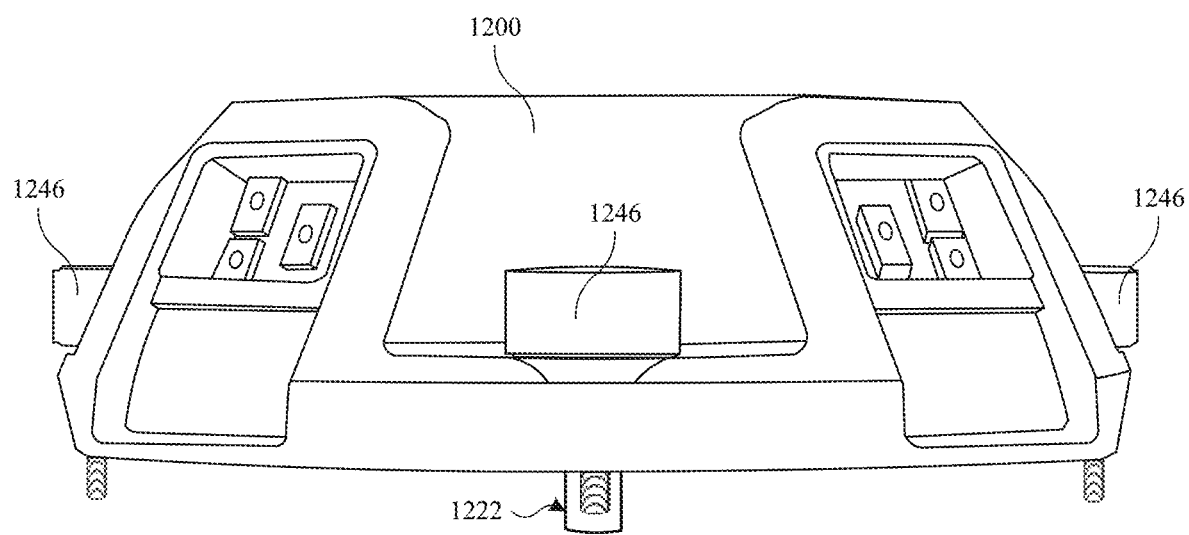
FIG. 12 is a fourth example of an attachment for a UAV.

FIG. 12 illustrates a fourth example of an attachment 1200. The attachment 1200 may be an IR attachment. The IR attachment may include one or more cameras (e.g., high-resolution cameras) that are configured to enhance operation of the UAV 100. For example, the IR attachment may include one or more cameras that are configured to provide panoramic (360 degree) views of an environment surrounding the UAV 100 during operation. Such cameras may facilitate better operation during nighttime via IR cameras. Alternatively, or additionally, the IR attachment may also include one or more visible light cameras to also further enhance daytime operation of the UAV 100. It should also be noted that the attachment 1200 may vary in size and/or shape and is not limited to the geometry shown in FIG. 12.

Additionally, to facilitate operation of the UAV 100 when utilizing the IR attachment, the IR attachment and/or the UAV 100 may include additional software that may be executed by a system of the UAV 100 and/or the IR attachment as described below. The software may allow, for example, autonomous operation of the UAV 100 during the night when implementing the one or more cameras of the IR attachment. Such software may include any executable instructions or protocols that may facilitate operation and/or additional functionality of the UAV 100 when using the IR attachment.

The attachment 1200 may be configured to be removably coupled to any one of the attachment interfaces described above. For example, the attachment 1200 may be configured for removable coupling to the top attachment interface 126 and/or the bottom attachment interface 234. The attachment 1200 may include a connector 1222 that may be similar to the connector 922 of the attachment 900 described above. The connector 1222 may be formed or directly connected to the attachment 1200 (e.g., a housing of the attachment 1200). Alternatively, the connector 1222 may be connected to the attachment 1200 via wiring, such as the wiring 740. Additionally, the attachment 1200 may include one or more fasteners 1246 to mechanically couple the attachment 1200 to the UAV 100. Thus, the attachment 1200 may be mechanically and/or electrically coupled to the UAV 100.

By way of example, the attachment 1200 may be coupled to the UAV 100 via an attachment surface of the top attachment interface 126 and/or the bottom attachment interface 234 in a manner similar to the one described with respect to attaching the attachment 900 to the attachment surface 928. That is, the fasteners 1246 may extend into the mounting holes 948 of the attachment surface 928 to couple the attachment 1200 to the UAV 100.

Similarly, though example attachment interfaces are described with respect to coupling the various attachments to the UAV 100, the attachments shown in in FIGS. 9-12 (and any other attachments contemplated herein) may be attached to any of the attachment interfaces of the UAV 100. For example, the attachments shown in FIGS. 9-12 may be coupled to the top attachment interface 126, the bottom attachment interface 234, any of the side attachment interfaces 130, another interface of the UAV 100 (e.g., located on the front 114 and/or the rear 116 of the UAV 100), or a combination thereof.

Figure 13:
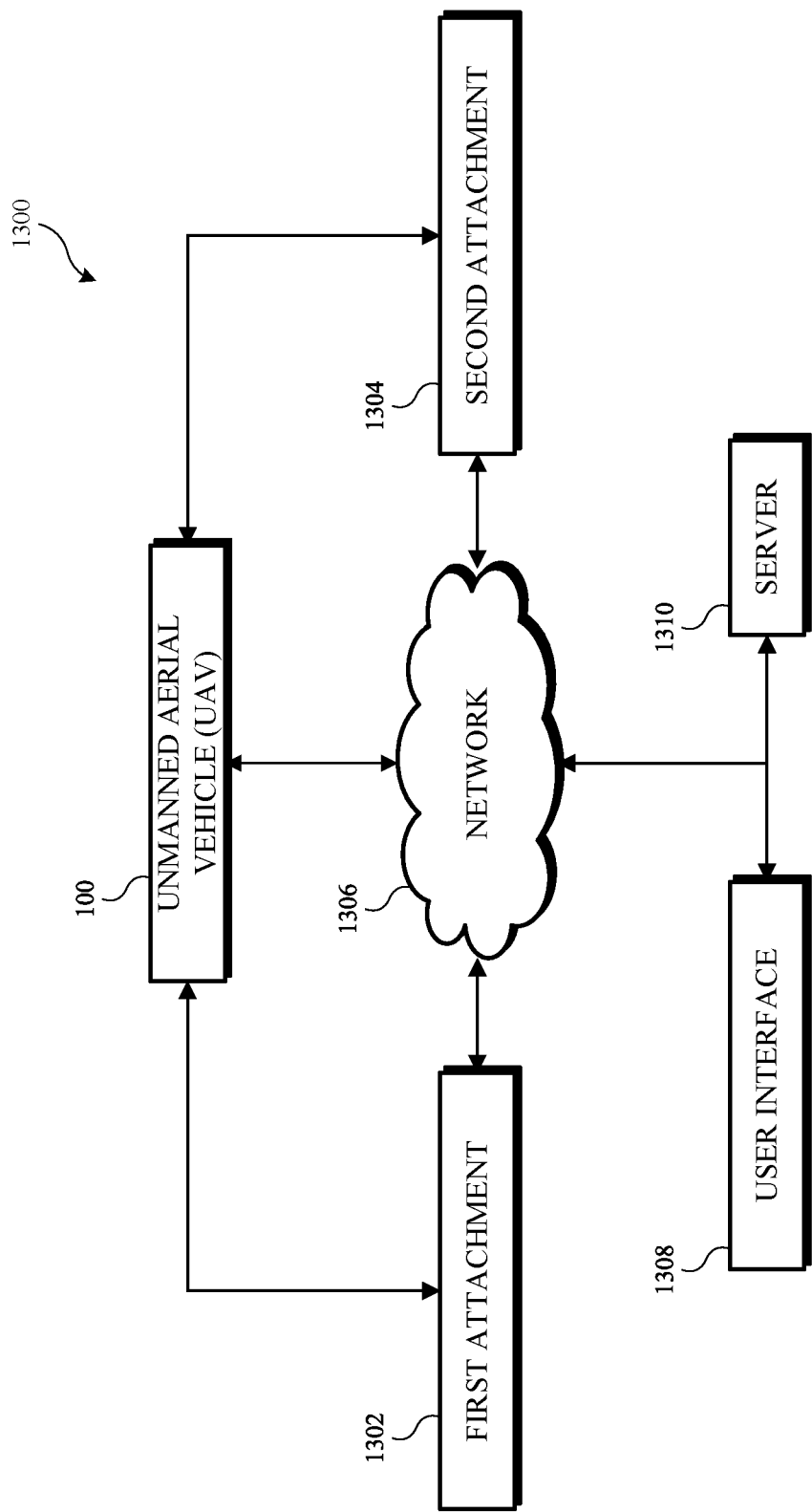
FIG. 13 is a diagram of a network configuration for a UAV.

FIG. 13 is a diagram 1300 of a network configuration for the UAV 100. For illustrative purposes, a first attachment 1302 and a second attachment 1304 are removably coupled to the UAV 100 and in electrical communication with the UAV 100. The first attachment 1302 and the second attachment 1304 may be any attachment, such as the attachment shown in FIGS. 9-12. In certain embodiments, it is envisioned that more than two attachments may be coupled to the UAV 100 and/or more than one UAV 100 may be connected via the network configuration.

The UAV 100 may be in communication with the first attachment 1302 and the second attachment 1304. For example, an electrical connection between the first attachment 1302 and the UAV 100 and between the second attachment 1304 and the UAV 100 may be established based upon a connector (e.g., the connector 722 or the connector 822) of the first attachment 1302 and a connector of the second attachment 1304 being inserted into respective ones of the connector ports (e.g., the connector ports 308) of the UAV 100. Such electrical connection may establish communication between the first attachment 1302 and the UAV 100 and between the second attachment 1304 and the UAV 100, thereby facilitating transfer of data and/or powering the first attachment 1302 and the second attachment 1304 via a power source of the UAV 100 (e.g., the battery 104). Such electrical connection may also establish a similar communication between the first attachment 1302 and the second attachment 1304 using the UAV 100 and an intermediary. It should also be noted that the first attachment 1302 and/or the second attachment 1304 may also be wirelessly connected to the UAV 100 and may each include their own dedicated power source (e.g., a battery).

The UAV 100 may be controlled autonomously by one or more onboard processing aspects or remotely controlled by an operator. For example, an operator (e.g., a user) may control operation or otherwise communicate with the UAV 100 via a user interface 1308. The user interface 1308 may be an electronic device in which the user may interface with the UAV 100 before, during, or after flight of the UAV 100. The electronic device may be an electronic device that is remotely located from the UAV 100, such as, for example, a mobile phone, tablet, laptop, desktop, wireless controller, or a combination thereof.

The UAV 100 and the user interface 1308 may be in wireless communication (e.g., wireless connection) via a network 1306 connection. The user interface 1308 may communicate with the UAV 100 via the network 1306 using a wireless communications link (e.g., a Wi-Fi network, a Bluetooth link, a ZigBee link, or another network or link). The user interface 1308 may also communicate with the UAV 100 via a cloud-based network in which the user interface 1308 is located remotely from the UAV 100.

To support such connection between the UAV 100 and the user interface 1308, the user interface 1308 and/or the UAV 100 may also be in communication with a server 1310. The server 1310 may be remotely located and configured to store data for the user interface 1308 and/or the UAV 100. The server 1310 may also be configured to store data for the first attachment 1302 and/or the second attachment 1304 or data for the UAV 100 associated with the first attachment 1302 and/or the second attachment 1304. As such, the server 1310 may communicate with the user interface 1308, the UAV 100, the first attachment 1302 and the second attachment 1304 (e.g., via the UAV 100), or a combination thereof via the network 1306. As a result, the user interface 1308, the UAV 100, the first attachment 1302, the second attachment 1304, or a combination thereof may access data stored on the server 1310.

By way of example, the UAV 100 may access the server 1310 in response to the first attachment 1302 and the second attachment 1304 being electrically connected to the UAV 100. The UAV 100 may access the server 1310 to obtain data associated with the first attachment 1302 and the second attachment 1304, such as flight characteristic information to adjust flight of the UAV 100 to accommodate for the additional payload of the first attachment 1302 and the second attachment 1304.

Additionally, such data may also be obtained by the user interface 1308 to adjust an experience for the user. That is, the user interface 1308 may be adjusted to provide additional functionality, such as control of the first attachment 1302 and/or the second attachment 1304 via the user interface 1308. For example, a user device (e.g., tablet, phone, wireless controller, etc.) may be in communication with the UAV 100 and the server 1310 via the network 1306, whereby the user device outputs the user interface 1308 as a graphical display. In such a case, the user interface 1308 displayed on the user device may be modified to provide additional control and/or functionality of the first attachment 1302 and/or the second attachment 1304.

As may be gleaned from the above, the network 1306 may facilitate entirely remote communication between a user and the UAV 100 (e.g., via the user interface 1308), including remote communication between the user and the first attachment 1302 and the second attachment 1304. Thus, the first attachment 1302 and the second attachment 1304 may only require an initial installation in-person and may thereafter be accessible and/or operational offsite by the user.

Figure 14:
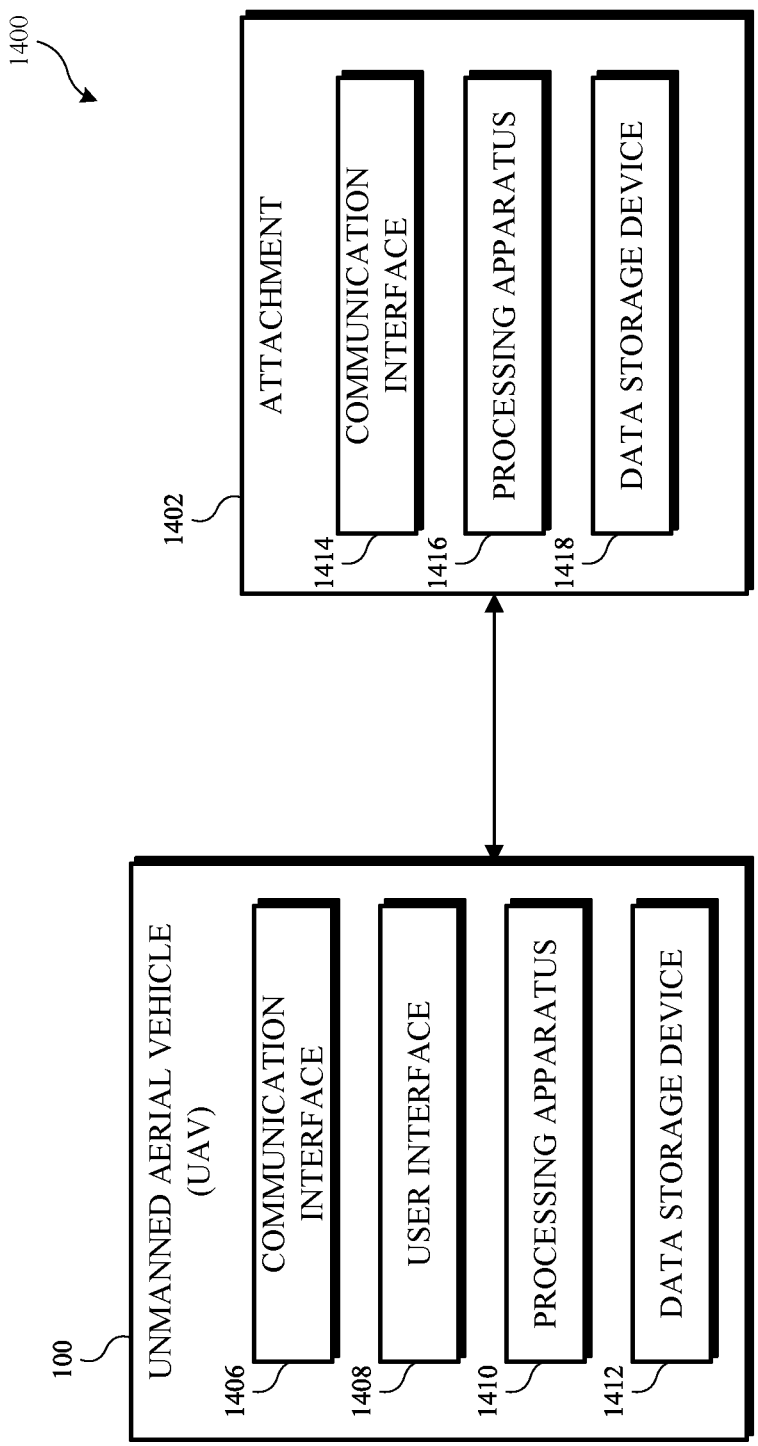
FIG. 14 is a block diagram of a UAV.

FIG. 14 illustrates a block diagram 1400 of the UAV 100 in communication (e.g., electrically connected) with an attachment 1402. That attachment 1402 may be in electrical connection with the UAV 100 in a similar manner to the first attachment 1302 and the second attachment 1304 as described above. The attachment 1402 may be any attachment, such as those shown in FIGS. 9-12, and may be removably coupled to the UAV 100.

As discussed above, the UAV 100 may include an attachment interface (e.g., the top attachment interface 126) that is configured to mechanically receive the attachment 1402 and removably couple the attachment 1402 to the UAV 100. The UAV 100 may also include a communication interface 1406, a user interface 1408, a processing apparatus 1410, and a data storage device 1412.

The communication interface 1406 may be configured to communicate with a communication interface 1414 of the attachment 1402. Such communication may establish the transfer of data between the UAV 100 and the attachment 1402. For example, in response to electrically coupling the attachment 1402 to the UAV 100, intrinsic characteristics of the attachment 1402 may be transmitted to the UAV 100 to modify one or more characteristics of the UAV 100, such as flight characteristics (e.g., propulsion characteristics), power consumption characteristics, user interface characteristics (e.g., the user interface 1408), or a combination thereof.

The processing apparatus 1410 may be in communication with the communication interface 1406. The processing apparatus 1410 may process data received by the communication interface 1406 from the attachment 1402. The processing apparatus 1410 may process such data to determine whether adjustments to one or more characteristics of the UAV 100 are necessary to accommodate the attachment 1402, such as the characteristics described above. For example, the processing apparatus 1410 may process the intrinsic characteristics of the attachment 1402 to determine a weight of the attachment 1402. Based on such weight, flight characteristics of the UAV 100 may be adjusted to ensure successful flight of the UAV 100 with the attachment 1402 coupled thereto.

Additionally, the processing apparatus 1410 and/or the communication interface 1406 may access the data storage device 1412. The data storage device 1412 may be accessed to retrieve stored data (e.g., information) pertaining to the UAV 100 and/or the attachment 1402.

The attachment 1402 may also include a processing apparatus 1416 and a data storage device 1418. The processing apparatus 1416 may operate in a similar manner to the processing apparatus 1410. Additionally, the data storage device 1418 may operate or function in a similar manner to the data storage device 1412. By way of example, the attachment 1402 may receive information from the UAV 100 (e.g., via transmission between the communication interface 1406 and the communication interface 1414), whereby the information from the UAV 100 may be processed by the processing apparatus 1416. Such information from the UAV 100 may also require the processing apparatus 1416 to retrieve data from the data storage device 1418.

For example, the UAV 100 may transmit operating commands to the attachment 1402 for operation of the attachment 1402 via the user interface 1408. The user interface 1408 may be similar to the user interface 1308 described above. In response to transmitting the operating commands to the attachment 1402, the processing apparatus 1416 may evaluate the operating commands to determine an operation of the attachment 1402 in response to the operating commands. Such operating commands may be cross-referenced with data stored in the data storage device 1418 to confirm the appropriate operation of the attachment 1402. However, the above is intended for illustrative purposes only. As such, the UAV 100 and the attachment 1402 may operate in any number of ways.

The above diagram 1300 of the network configuration and the block diagram 1400 may include additional software and/or hardware components, which may be included in the network 1306, the UAV 100, the first attachment 1302, the second attachment 1304, the attachment 1402, or a combination thereof.

For example, one or more of the above may include various engines, each of which may be constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software. For example, such engines may be part of, or may include, the processing apparatus 1410 of the UAV 100 and/or the processing apparatus 1416 of the attachment 1402.

In an example, the software may reside in executable or non-executable form on a tangible machine-readable storage medium, such as on the server 1310, the data storage device 1412 of the UAV 100, the data storage device 1418 of the attachment 1402, or a combination thereof. Software residing in non-executable form may be compiled, translated, or otherwise converted to an executable form prior to, or during, runtime. In an example, the software, when executed by the underlying hardware of the engine (e.g., the processing apparatus 1410 and/or the processing apparatus 1416), causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers (e.g., the electronic device for the user interface 1308, the electronic componentry of the UAV 100 and/or the attachment 1402 shown in the block diagram 1400, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality. However, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Furthermore, the above functionality may be applicable to hardware and/or software of the user interface 1308 (e.g., the remote electronic device providing the user interface 1308), the server 1310, the UAV 100, the first attachment 1302, the second attachment 1304, and the attachment 1402.

Figure 15:
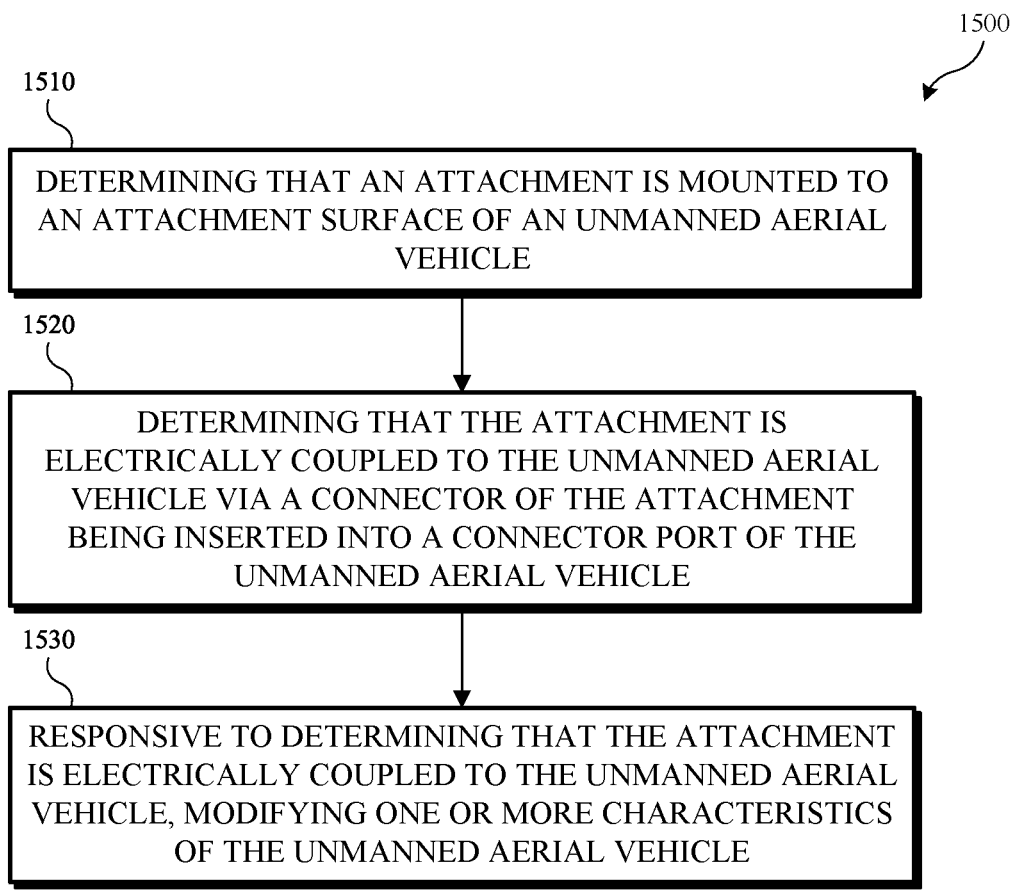
FIG. 15 is a flow diagram of an example of a method for attaching an attachment to a UAV.

FIG. 15 is a flow diagram of an example of a method 1500 for installation of an attachment to the UAV 100, such as the attachments described herein. The method 1500 may be executed using one or more computing devices or components or modules associated therewith, such as the systems, hardware, and software described with respect to FIGS. 13 and 14, including the user interface 1308 (e.g., the remote electronic device providing the user interface 1308), the server 1310, the UAV 100, the first attachment 1302, the second attachment 1304, and the attachment 1402. The method 1500 may be performed, for example, by executing a machine-readable program or other computer-executable instructions, such as routines, instructions, programs, or other code. The steps, or operations, of the method 1500 or another technique, method, process, or algorithm described in connection with the other implementations disclosed herein may be implemented directly in hardware, firmware, software executed by hardware, circuitry, or a combination thereof.

As shown in FIG. 15, the method 1500 includes determining (or detecting) that an attachment is mounted to an attachment surface of a UAV host, e.g., the UAV 100, at 1510. The attachment may be any attachment coupled to the UAV 100, such as those shown in FIGS. 9-12. For example, this process may include automatically detecting the attachment. The method 1500 may also include, at 1520, determining that the attachment is electrically and/or communicatively coupled to the UAV 100 via a connector of the attachment being inserted into a connector port of the UAV 100, such as the connector 722 and the connector ports 308. For example, this process may include executing one or more protocols to automatically verify communication with the attachment and/or ensure that the attachment is recognized and/or otherwise approved for use by the UAV 100. In some implementations, the attachment may automatically provide or convey information about the attachment including, but not limited to, type of attachment, features, characteristics, or functionality associated with the attachment, control mechanisms, etc.

Such protocols may also be used to encrypt communication between the attachments and the UAV 100 and may include, for example, MAVLink or LCM protocols. The protocols may be split into separate protocol levels (e.g., higher tier security protocols and lower tier security protocols) based upon certain operations of the UAV 100 and/or the attachments. For example, lower tier protocols may utilize a USB protocol layer (e.g., VID/PID) without a cryptographic authentication while higher tier protocols (e.g., for control of the UAV 100) may utilize USB Authentication protocol, USB-ethernet and transport layer security (TLS), secure socket layer (SSL) security, or similar and/or additional cryptographic authentication schemes (e.g., x.509 based certificate scheme to accommodate US federal encryption requirements). The protocols may also be utilized to establish approved users and/or approved UAVs (e.g., the UAV 100), such as through a cloud-based network or the network 1306. Moreover, the protocols may also be utilized to communicate with and/or identify serialized attachments, whereby attachments may have a unique product identification (ID) and/or a proprietary serial number.

In additional to the above protocols, a hardware ID pin may be utilized for attachments, whereby the hardware ID pin may include a resistor with analog value or a similar hardware scheme to represent a specific attachment, thereby potentially eliminating software protocols in certain configurations. For example, integrated circuit communication protocols (e.g., IC and/or IC2) may be utilized to identify the attachments.

Responsive to determining that the attachment is electrically and/or communicatively coupled to the UAV 100, the method 1500 also includes modifying (e.g., automatically modifying) one or more characteristics of the UAV 100, such as flight characteristics, power consumption characteristics, and user interface characteristics at 1530. For example, this process may include executing one or more protocols to request or otherwise receive attachment intrinsic characteristics that may affect the navigation of the UAV 100. In some implementations, the protocol may be used to automatically convey information about the attachment and the UAV 100 may responsively change propulsion characteristics (e.g., automatically load correct flight parameters, etc.)

In certain configurations, responsive to determining that the attachment is electrically coupled to the UAV 100, the method may also include synchronizing time between the attachment and the UAV 100 to align a timestamp of the attachment with a timestamp of the UAV 100. A Time Synchronization Protocol (e.g., Time Synchronization Pulses) may be implemented to synchronize time between the attachment and the UAV 100 such as, for example Pulse Per Second (PPS), Network Time Protocol (NTP), Precision Time Protocol (PTP), Inter-Range Instrumentation Group (IRIG) time codes, Global Positioning System (GPS) time signals, radio time signals, or a combination thereof.

Such synchronization may be used for various functionality of the attachment or a plurality of attachments and/or for various functionality of the UAV 100. For example, such synchronization may align operation of the spotlight attachment or other lighting attachment with operation of the camera system 106, may facilitate pulsing the spotlight attachment to enable higher power output in certain circumstances (e.g., to align with use of the camera system 106, such as image and/or video capturing), or both.

Further examples may include varying a pulse width of a time-sync signal (e.g., the Time Synchronization Pulses) to create the above pulsed lighting via the spotlight attachment or other lighting attachment to exhibit various visual effects, to optimize power and thermal performance, and/or to optimize conditions for autonomous operation (e.g., flight) of the UAV to provide more or less light as needed (e.g., less light for "stealth" of the UAV 100 and/or to minimize detection of the UAV 100). Further, such time synchronization may facilitate a real time pulse signal for critical safety systems of the UAV 100 to maintain communication with the UAV 100. Moreover, such time synchronization may also aid in maintaining low latency and secure communication channels between the various attachments and the UAV 100 (e.g., the host system of the UAV 100). Thus, time synchronization may be facilitated with any of the attachments described herein or may be a separate attachment coupled to the UAV 100 specifically for time synchronization and facilitating one or more of the above examples.

It should be noted that while the above method 1500 describes responsive steps in response to determining that the attachment is electrically coupled to the UAV 100, such responses may also be in response to mechanically coupling the attachment to the UAV 100. That is, any operations described herein (e.g., modifying one or more characteristics of the UAV 100) may be in response to mechanically and/or electrically coupling the various attachments to the UAV 100. For example, the mechanical coupling of an attachment to the UAV 100 may be determined based upon detection of the mechanical coupling by one or more sensors of the UAV 100 (e.g., one or more sensors of the attachment interfaces) such that mechanical coupling may or must be completed prior to modifying one or more characteristics of the UAV 100. Similarly, detection may be manually entered by a user through the user interface to confirm installation of the UAV 100 mechanically and/or electrically.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (e.g., an angle that lies within the range of (approximately) 135° to (approximately) 225°). The term "generally parallel" should thus be understood as referring to encompass configurations in which the pertinent components are arranged in parallel relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An unmanned aerial vehicle system, comprising:
   an unmanned aerial vehicle that includes:
      a housing that forms an outer shell of the unmanned aerial vehicle;
      a first side attachment interface integrally formed with a first side surface of the housing, wherein the first side attachment interface includes a connector port that is located within a recess defined by the first side attachment interface; and
      a second side attachment interface integrally formed with a second side surface of the housing and located directly opposite to the first side attachment interface relative to a longitudinal axis of the unmanned aerial vehicle, wherein the second side attachment interface includes a connector port that is located within a recess defined by the second side attachment interface; and
   an attachment configured to removably couple to one or more of the first side attachment interface or the second side attachment interface such that the attachment is positioned adjacent to the first side surface or the second side surface of the housing.

2. The unmanned aerial vehicle system of claim 1, wherein the first side attachment interface and the second side attachment interface each include an attachment surface, wherein at least a portion of the attachment is configured to directly or indirectly abut the attachment surface, and wherein the connector port is configured to receive a connector of the attachment to electrically couple the attachment to the unmanned aerial vehicle.

3. The unmanned aerial vehicle system of claim 2, wherein the attachment is configured to directly abut one or more of the attachment surface of the first side attachment interface or the attachment surface of the second side attachment interface when the attachment is removably coupled to the unmanned aerial vehicle.

4. The unmanned aerial vehicle system of claim 2, further comprising an attachment bracket coupled to the attachment and configured to removably couple the attachment to one or more of the attachment surface of the first side attachment interface or the attachment surface of the second side attachment interface.

5. The unmanned aerial vehicle system of claim 4, wherein the first side attachment interface includes one or more mounting holes located on the attachment surface of the first side attachment interface, wherein the one or more mounting holes are configured to align with one or more mounting holes of the attachment bracket such that one or more fasteners extend through the one or more mounting holes of the attachment bracket and into the one or more mounting holes.

6. The unmanned aerial vehicle system of claim 1, wherein the attachment is configured to mechanically and electrically couple to the unmanned aerial vehicle.

7. The unmanned aerial vehicle system of claim 6, wherein the attachment is powered by a power source of the unmanned aerial vehicle.

8. The unmanned aerial vehicle system of claim 1, wherein the attachment is configured to removably couple to the first side attachment interface or the second side attachment interface so that the attachment is positioned adjacent to or abuts a battery of the unmanned aerial vehicle.

9. An unmanned aerial vehicle system, comprising:
   an unmanned aerial vehicle that includes:
      attachment interfaces that include:
         a top attachment interface located on a top surface of the unmanned aerial vehicle and includes projections that extend from an attachment surface of the top attachment interface, wherein a connector port of the top attachment interface is positioned within a perimeter defined by the projections;
         a first side attachment interface located on a first side surface of the unmanned aerial vehicle;
         a second side attachment interface located on a second side surface of the unmanned aerial vehicle that opposes the first side surface; and
         a bottom attachment interface located on a bottom surface of the unmanned aerial vehicle; and
   one or more attachments configured to removably couple to at least one of the top attachment interface, the first side attachment interface, the second side attachment interface, or the bottom attachment interface.

10. The unmanned aerial vehicle system of claim 9, wherein each of the attachment interfaces includes:
    an attachment surface, wherein the one or more attachments are configured for positioning that is adjacent to the attachment surface when the one or more attachments are removably coupled to the unmanned aerial vehicle; and
    one or more mounting holes disposed on the attachment surface.

11. The unmanned aerial vehicle system of claim 10, wherein:
    the bottom attachment interface includes projections that extend from the attachment surface of the bottom attachment interface and are configured to align the one or more attachments with the attachment surface of the bottom attachment interface such that one or more fasteners extend through the one or more attachments and into the one or more mounting holes of the bottom attachment interface; and
    the projections of the top attachment interface extend from the attachment surface of the top attachment interface and are configured to align the one or more attachments with the attachment surface of the top attachment interface such that one or more fasteners extend through the one or more attachments and into the one or more mounting holes of the top attachment interface.

12. The unmanned aerial vehicle system of claim 10, wherein the perimeter defined by the projections of the top attachment interface are located on an attachment surface of the top attachment interface, and wherein the perimeter encompasses the one or more mounting holes.

13. The unmanned aerial vehicle system of claim 10, wherein the connector port of the top attachment interface is a first connector port, and wherein the top attachment interface further includes a second connector port that is positioned outside of the perimeter defined by the projections of the top attachment interface.

14. The unmanned aerial vehicle system of any of claim 10, wherein the connector port of the top attachment interface is configured to electrically couple to a connector of the one or more attachments such that the one or more attachments are powered by a power source of the unmanned aerial vehicle.

15. The unmanned aerial vehicle system of claim 14, wherein the connector includes a male keying portion that is configured to insert into a female keying portion of the connector port of the top attachment interface.

16. An unmanned aerial vehicle system, comprising:
    an unmanned aerial vehicle that includes an attachment interface located on a top side or a bottom side of the unmanned aerial vehicle with respect to an elevational direction of movement of the unmanned aerial vehicle, wherein the attachment interface includes:
       an attachment surface that is positioned adjacent to or abuts a battery of the unmanned aerial vehicle;
       mounting holes located on the attachment surface; and
       a connector port; and
    an attachment configured to:
       removably couple to the attachment surface via fasteners that extend through the attachment and into respective ones of the mounting holes such that the attachment is coupled to attachment surface free of obstruction of the battery; and
       electrically couple to the connector port via a connector that is inserted into the connector port to power the attachment by the battery.

17. The unmanned aerial vehicle system of claim 16, wherein the attachment interface further includes projections that extend from the attachment surface and define a perimeter, wherein the attachment is configured for positioning within the perimeter when the attachment is removably coupled to the attachment surface.

18. The unmanned aerial vehicle of claim 17, wherein the connector port is located within a recess defined by the attachment surface and the perimeter encompasses the connector port.

19. The unmanned aerial vehicle of claim 16, wherein the attachment interface further includes a cover disposed over the connector port that is configured to protect the connector port when the attachment is not removably coupled to the attachment surface.

20. The unmanned aerial vehicle of claim 16, wherein the connector port is configured to receive a universal serial bus connector of the attachment.

* * * * *